(12) United States Patent
Pitts

(10) Patent No.: US 10,440,141 B2
(45) Date of Patent: Oct. 8, 2019

(54) DISTRIBUTED FILESYSTEM ATOMIC FLUSH TRANSACTIONS

(71) Applicant: William M Pitts, Los Altos, CA (US)

(72) Inventor: William M Pitts, Los Altos, CA (US)

(*) Notice: Subject to any disclaimer, the term of this patent is extended or adjusted under 35 U.S.C. 154(b) by 174 days.

(21) Appl. No.: 15/726,116

(22) Filed: Oct. 5, 2017

(65) Prior Publication Data
US 2018/0048733 A1    Feb. 15, 2018

Related U.S. Application Data

(63) Continuation of application No. 13/930,560, filed on Jun. 28, 2013, now abandoned.

(60) Provisional application No. 61/666,597, filed on Jun. 29, 2012.

(51) Int. Cl.
| | |
|---|---|
| *G06F 12/12* | (2016.01) |
| *H04L 29/08* | (2006.01) |
| *G06F 16/182* | (2019.01) |
| *G06F 15/167* | (2006.01) |
| *H04L 12/24* | (2006.01) |
| *H04L 29/06* | (2006.01) |
| *G06F 12/0804* | (2016.01) |
| *G06F 12/0891* | (2016.01) |
| *G06F 16/172* | (2019.01) |

(52) U.S. Cl.
CPC ...... *H04L 67/2852* (2013.01); *G06F 12/0804* (2013.01); *G06F 12/0891* (2013.01); *G06F 15/167* (2013.01); *G06F 16/172* (2019.01); *G06F 16/182* (2019.01); *G06F 16/183* (2019.01); *H04L 41/00* (2013.01); *H04L 65/40* (2013.01); *H04L 67/06* (2013.01); *H04L 67/1097* (2013.01)

(58) Field of Classification Search
CPC ..... H04L 67/2852; H04L 41/00; H04L 65/40; H04L 67/06; H04L 67/1097; G06F 16/182; G06F 16/183; G06F 16/172; G06F 12/0804; G06F 12/0891; G06F 15/167
See application file for complete search history.

(56) References Cited

U.S. PATENT DOCUMENTS

| | | | |
|---|---|---|---|
| 8,417,681 B1* | 4/2013 | Miloushev | G06F 16/10 707/704 |
| 2006/0129627 A1* | 6/2006 | Phillips | H04L 63/10 709/200 |
| 2012/0150804 A1* | 6/2012 | Adkins | G06F 16/1865 707/639 |

* cited by examiner

*Primary Examiner* — Anthony Mejia
*Assistant Examiner* — Jihad K Boustany
(74) *Attorney, Agent, or Firm* — Dodd Call Black, PLLC; Dustin Call

(57) ABSTRACT

Large scale high performance file proxy caching sites may be configured to coalesce many client write operations into one very large assemblage of modified file data. At some point the caching site will flush all modified file data downstream towards the origin file server. In some instances the amount of modified data being flushed may be more than can be transferred in a single network request. When multiple network requests are required, the consistency guarantee provided by many filesystems requires that the file either be updated with the data contained in all of the network requests or not be modified at all. In addition, once the first flush request is processed no other file read or write requests can be serviced until the last flush request has been processed. This document discloses methods for performing atomic multi-request flush operations within a large geographically distributed filesystem environment.

8 Claims, 11 Drawing Sheets

DDS Flat Network

DDS Flat Network

DDS Hierarchical Network with High Availability File Server

```
# File:   /etc/dds_exports        (exported filesystems)

/export/eng/hw        *(rw,sync,wdelay,root_squash)
/export/eng/sw        *(rw,sync,wdelay,root_squash)
```

Site Map File: eng

Figure 3

```
# File:   /._dds_./._site_/._control_/._map_.

DOMAIN:     acme

MANAGERS:   acme-1 acme-2 acme-3 acme-4

MEMBERS:    n1    corp
            n2    mrkt
            n3    sales
            n4    eng
```

Domain Map File: acme-1

Figure 4

Site Tree: eng

Domain Tree: acme

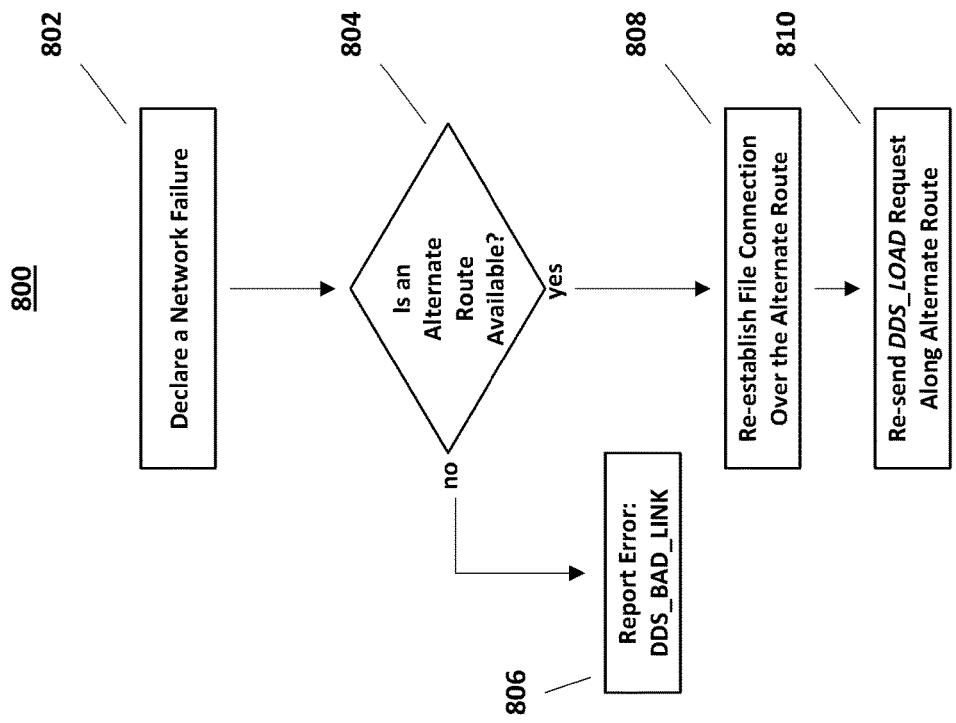

DISTRIBUTED FILESYSTEM ATOMIC FLUSH TRANSACTIONS

CROSS-REFERENCE TO RELATED APPLICATIONS

This application is a continuation of, and claims the benefit of and priority to U.S. patent application Ser. No. 13/930,560 filed on Jun. 28, 2013, which application is incorporated herein by reference in its entirety.

U.S. patent application Ser. No. 13/930,560 claims the benefit of and priority to U.S. Provisional Patent Application Ser. No. 61/666,597 filed on Jun. 29, 2012, which application is incorporated herein by reference in its entirety.

U.S. patent application Ser. No. 13/930,560 is related to, and incorporated herein by reference in its entirety, U.S. application Ser. No. 13/930,537, filed on Jun. 28, 2013, which application is incorporated herein by reference in its entirety.

U.S. patent application Ser. No. 13/930,560 is related to, and incorporated herein by reference in its entirety, U.S. application Ser. No. 13/930,594, filed on Jun. 28, 2013, which application is incorporated herein by reference in its entirety.

U.S. patent application Ser. No. 13/930,560 is related to, and incorporated herein by reference in its entirety, U.S. application Ser. No. 13/930,630, filed on Jun. 28, 2013, which application is incorporated herein by reference in its entirety.

BACKGROUND OF THE INVENTION

The Distributed Data Service (DDS) architecture provides a framework for highly distributed, hierarchical, multi-protocol caching. DDS is a distributed caching layer that spans an enterprise's network, encompassing multiple LANs interconnected with WAN links. The caching layer's constituent parts are DDS modules installed on file servers, client workstations, and intermediate nodes (routers, switches, and computers). DDS employs TCP/IP for inter-site communications and may therefore be incrementally deployed. Non-DDS nodes appear as "just part of the wire".

Conceptually, the DDS caching layer slices through each DDS configured computer system at the vnode interface layer. File systems (UFS, VxFS, NTFS, EXT4) and other devices such as video sources and shared memory plug into the bottom of the caching layer and provide permanent file storage or a data sourcing/sinking capability. Client systems plug into the top of the caching layer to access "local" data. Distributed throughout the network, intermediate DDS nodes (routers, switches, and other computers) provide increased scalability and faster file access.

The DDS layer implements an intelligent integrated data streaming and caching mechanism to make file data appear as "local" as possible. When a client process accesses a file, the file appears to be local (in terms of file access performance) if it has been accessed before and has not been modified since its last access. When file data must be fetched from the origin server, DDS pre-fetches file data in advance of the client's request stream. Of course, pre-fetching is only performed for well-behaved clients. Write behind is also implemented by DDS in a manner consistent with the fact that users aren't very tolerant of file systems that lose their data.

Data cached within the DDS layer is stored in a protocol neutral format in a manner that requires no "translation" when the client is of the same type (Unix, Windows, . . . ) as the origin server.

The DDS layer maintains "UFS consistency" (a read always returns the most recently written data) on cached images and provides several methods of handling and recovering from network partitioning events. To the maximum extent possible, recovery and reconnection is performed automatically with no requirement for user or administrator intervention.

This document discloses and explains the methods and procedures employed by DDS to transparently overcome network infrastructure failures. In this context, "transparent" means that when an intermediate network node or link fails during a DDS file access operation, an alternate path to the origin server is discovered and used to complete the operation without the client or server ever even becoming aware of the network failure.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes a computing system where a data request has been passed between an upstream site and a file service proxy cache node, the file service proxy cache node being a network node located between the upstream site and the origin file system node, a non-transitory computer-readable storage medium including instructions that, when executed by the file service proxy cache node, performs the step receiving a flush request from the upstream site. The flush request includes a request to save flush data contained in the flush request to a stable memory. The instructions also perform the steps storing the flush data in a shadow extent and dispatching a downstream flush request to a second file service proxy cache node. The instructions further perform the step receiving a response to the downstream flush request from the second file service proxy cache node. The instructions additionally perform the step sending a flush response that includes a status code that indicates the successful completion of the request to the upstream site.

Another example embodiment includes a computing system where a data request has been passed between an upstream site and a file service proxy cache node, the file service proxy cache node being a network node located between the upstream site and the origin file system node, a non-transitory computer-readable storage medium including instructions that, when executed by the file service proxy cache node, performs the step receiving a flush request from the upstream site. The flush request includes a request to save flush data contained in the flush request to a stable memory. The instructions also perform the step storing the flush data in a shadow extent. The instructions further perform the steps, if the file service proxy cache node is not a server terminator site, dispatching a downstream flush request to a second file service proxy cache node and receiving a response to the downstream flush request from the second file service proxy cache node. The instructions additionally perform the step sending a flush response that includes a status code that indicates the successful completion of the request to the upstream site.

Another example embodiment includes a computing system where a data request has been passed between an upstream site and a file service proxy cache node, the file service proxy cache node being a network node located between the upstream site and the origin file system node, a non-transitory computer-readable storage medium including instructions that, when executed by the file service proxy cache node, performs the step receiving a flush request from the upstream site. The flush request includes a request to save flush data contained in the flush request to a stable memory and a flush level, wherein the flush level indicates how far the data should be flushed. The instructions also perform the step storing the flush data in a shadow extent. The instructions further perform the steps, if the file service proxy cache node is not a server terminator site, dispatching a downstream flush request to a second file service proxy cache node and receiving a response to the downstream flush request from the second file service proxy cache node. If the downstream flush request was successfully completed the instructions additionally perform the step promoting the shadow extents. The instructions moreover perform the step sending a flush response that includes a status code that indicates the successful completion of the request to the upstream site.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIG. 3 depicts the /etc/dds_exports file (also referred to as the site map file) for node 4, which exports the eng sub-domain;

FIG. 4, illustrates the domain map file for node 1;

FIG. 7, depicts a simple hierarchy of DDS nodes configured with multiple routes from node A to the origin server node (node S);

FIG. 8 is a flowchart illustrating an example of a method 800 of recursive ascent failure notifications;

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention.

DDS Domain Architecture

A DDS network may be configured into either a flat or hierarchical organization. Hierarchical topologies inherently provide more latitude for constructing networks incorporating redundant paths. When network failures do occur, DDS employs redundant network paths to transparently re-route file access traffic around the failure.

Figure 1:
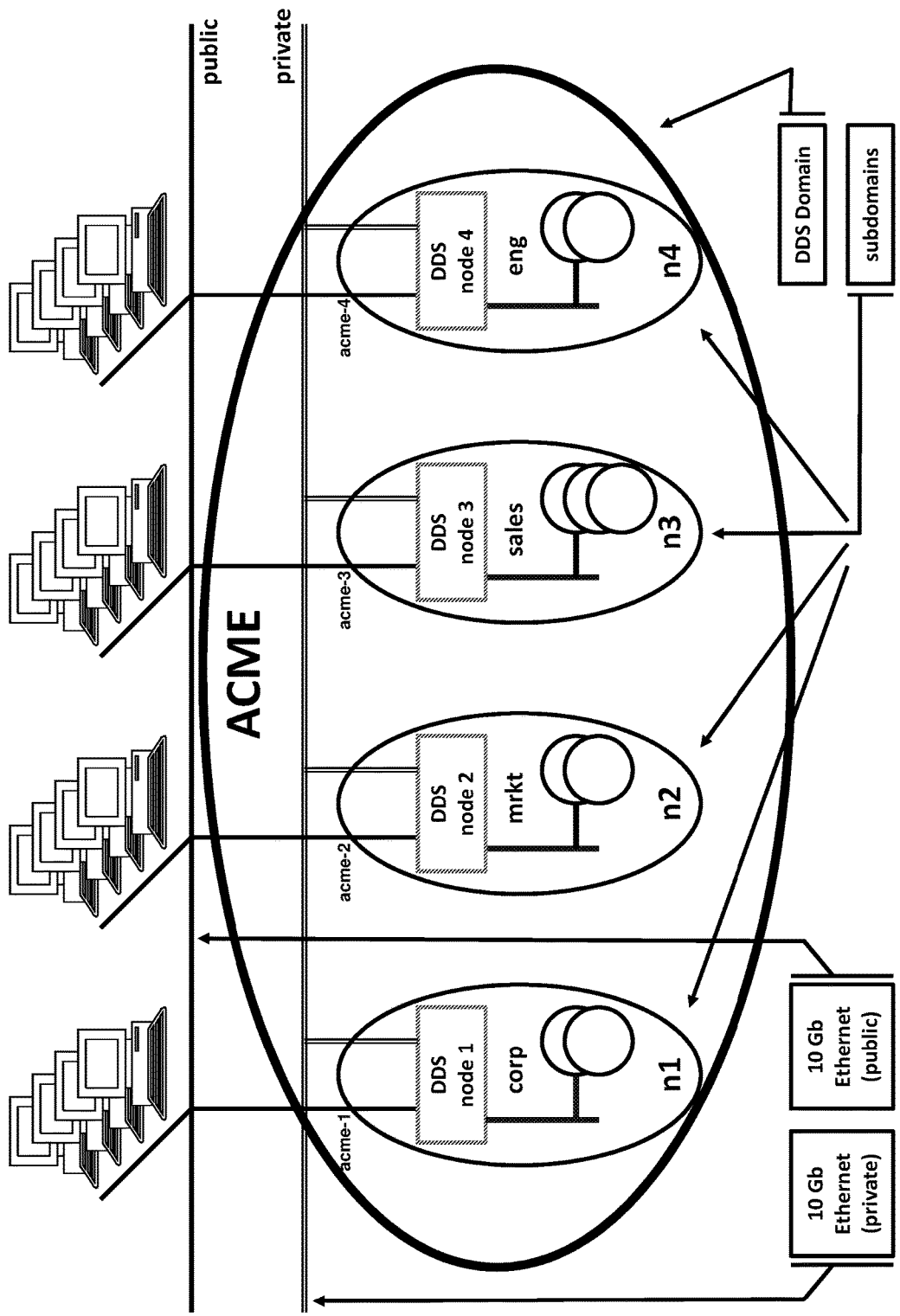
FIG. 1 illustrates a DDS virtual file server constructed with a flat network topology.

FIG. 1 illustrates a DDS virtual file server constructed with a flat network topology. The virtual file server exports the acme domain, consisting of four sub-domains: corp, mrkt, sales and eng. The virtual file server appears to be a single multi-homed (multiple ip addresses) Windows or Linux file server to client workstations. The public network interfaces are DNS registered with the names acme-1, acme-2, acme-3 and acme-4. Workstations may use any of the four public interfaces and may switch to using a different interface at any time.

When all components of the virtual file server are operating properly, the "view through any portal" is equivalent to the view through any other portal. DDS's distributed consistency mechanism works behind the scenes to ensure this consistency of views. However, when a network node fails, a flat network topology does not provide the redundant paths necessary to provide transparent uninterrupted access to all file server data.

Figure 2:
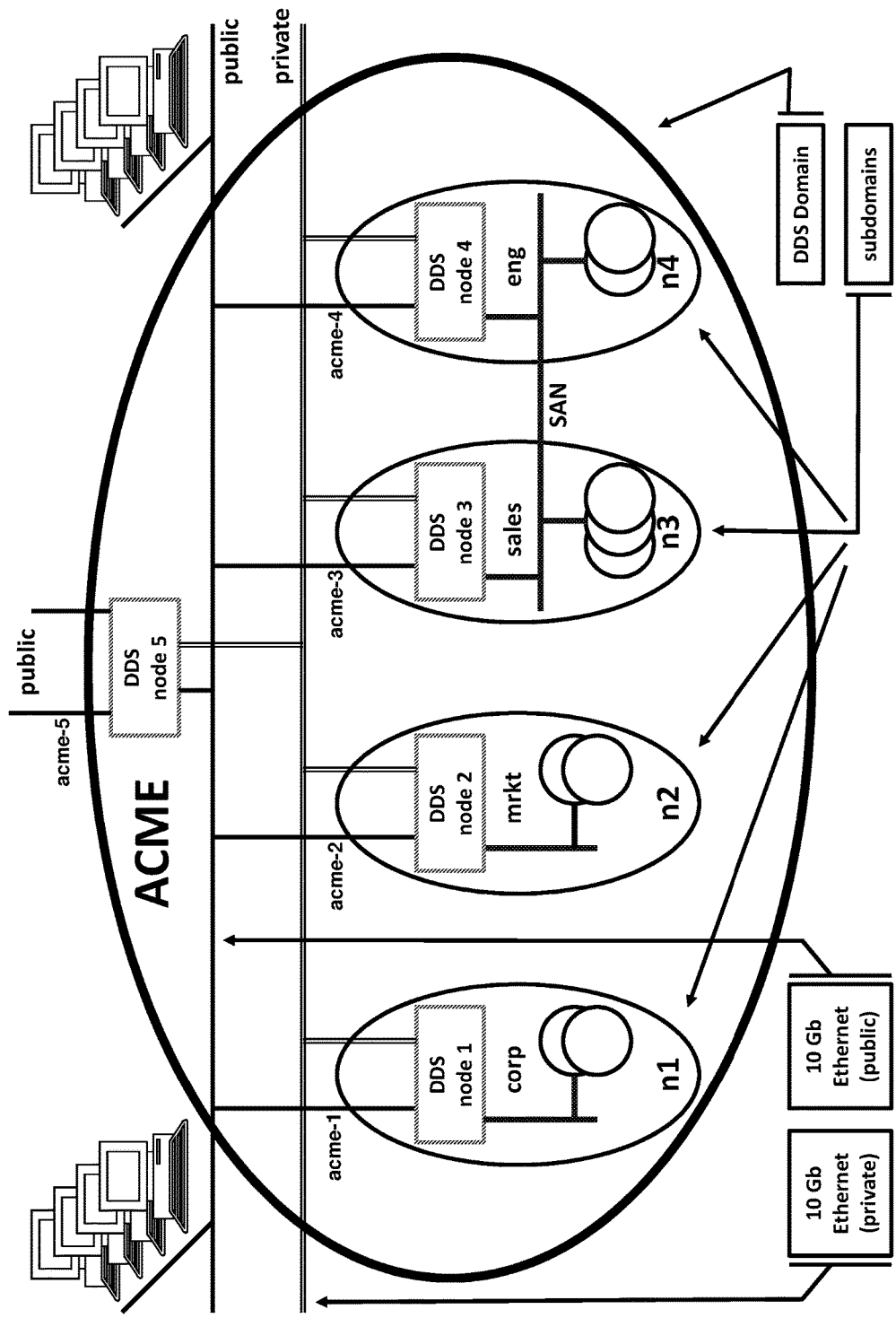
FIG. 2 depicts the flat network of FIG. 1 reconfigured to provide high availability access to the eng and sales sub-domains, and another node has been added to create redundant network paths.

FIG. 2 depicts the flat network of FIG. 1 reconfigured to provide high availability access to the eng and sales sub-domains, and another node has been added to create redundant network paths.

Nodes 3 and 4 have shared access to a storage area network (SAN) containing the filesystems exported through the eng and sales sub-domains. These two nodes are configured such that if either node fails, the other node will notice the failure and mount and export the failed node's filesystems. This is a standard high availability file server mechanism and products are available from several sources, both supported and freeware.

Another node has been added to the configuration depicted in FIG. 1. Node 5, named acme-5, does not export any of its own filesystems. It is a domain manager providing the same "portal view" as the other four nodes. However, it also serves as the DDS gateway for remote clients and remote DDS workgroup accelerators.

DDS nodes operate independently and cooperatively to create a hierarchical global namespace. During its initialization phase a DDS node constructs a site tree as specified by the /etc/dds_exports file. FIG. 3 depicts the /etc/dds_exports file (also referred to as the site map file) for node 4, which exports the eng sub-domain.

After constructing the site tree, the DDS node constructs a domain tree as specified by the /._dds_./._site_./._control_./._map_. file. FIG. 4, illustrating the domain map file for node 1, specifies:
- the domain's name is acme,
- the domain has four domain managers: acme-1, acme-2, acme-3 and acme-4,
- the domain has four sub-domains:
  - n1 exporting the corp sub-domain,
  - n2 exporting the mrkt sub-domain,
  - n3 exporting the sales sub-domain, and
  - n4 exporting the eng sub-domain.

The names used in a domain map file may be public names (registered with a network name service such as DNS) or they may be private. In this example, n1 through n4 are private names and acme-1 through acme-4 are public names. The domain nodes communicate with each other using the domain's private names, and clients of the DDS virtual file server use the domain's public names. A node's private name and public name may resolve to the same IP address or to different IP addresses.

Once initialization is complete, the node exports these two trees. The site tree is a single filesystem containing all content exported by this node. The domain tree is a single filesystem containing all content exported by all sub-domain nodes for which this node is a domain manager.

A DDS node may host:
- An atomic domain—The node has a /etc/dds_exports file but there is no /._dds_./._site_./._control_./._map_. file. An atomic domain does not contain any sub-domains. The node's site tree is also its domain tree (by way of a symbolic link).
- A non-atomic domain—The node has a /._dds_./._site_./._control_./._map_. file which specifies the domain's name and the names of all sub-domains. The node might not have a /etc/dds_exports file, in which case the node does not contribute any content to the domain for which it was a domain manager. Or, the node might have a site tree (specified by the /etc/dds_exports file) that may or may not be included in its domain tree.

DDS Initialization

Figure 5:
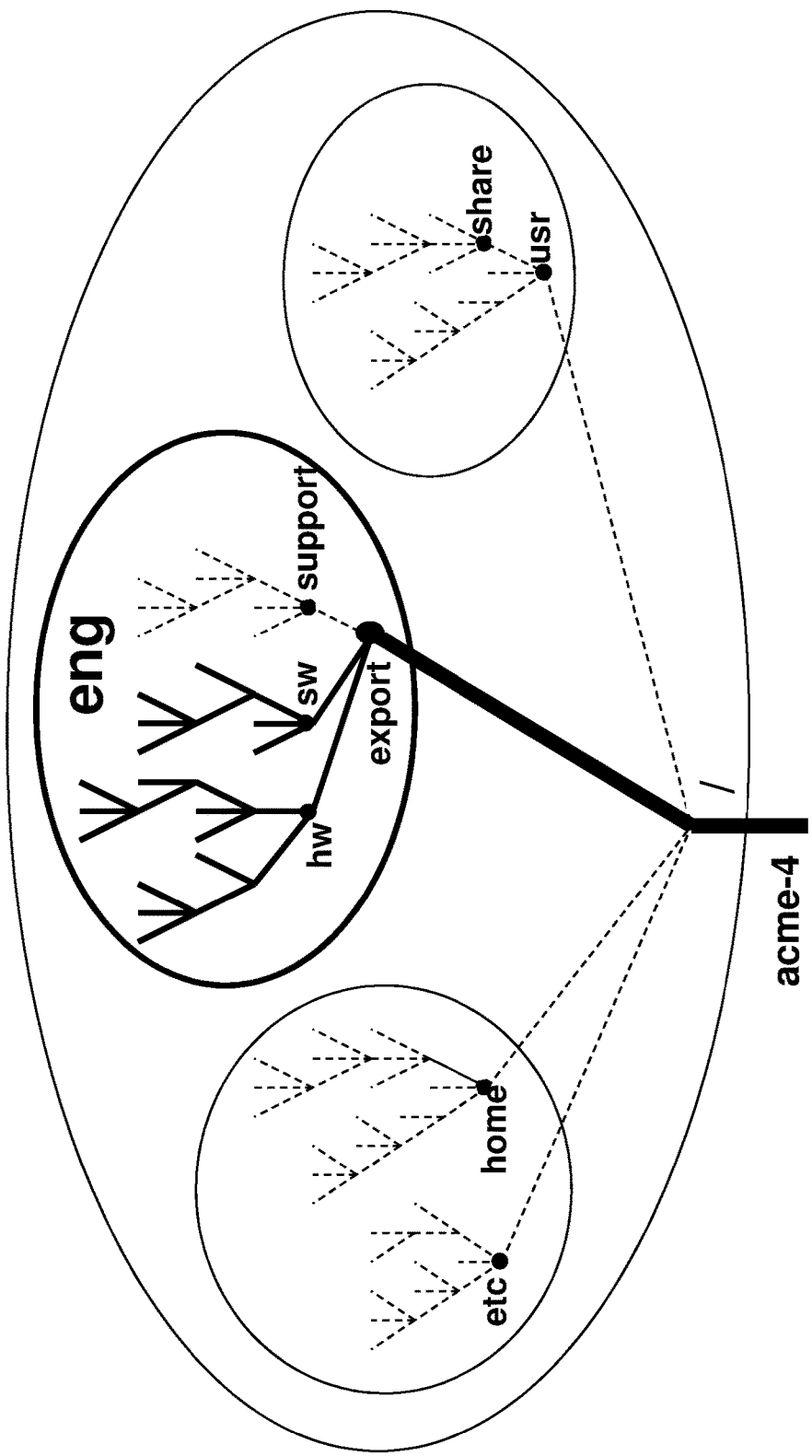
FIG. 5 illustrates the export filesystem (site tree) constructed by acme-4 by following the directions contained in the site map file.
Figure 6:
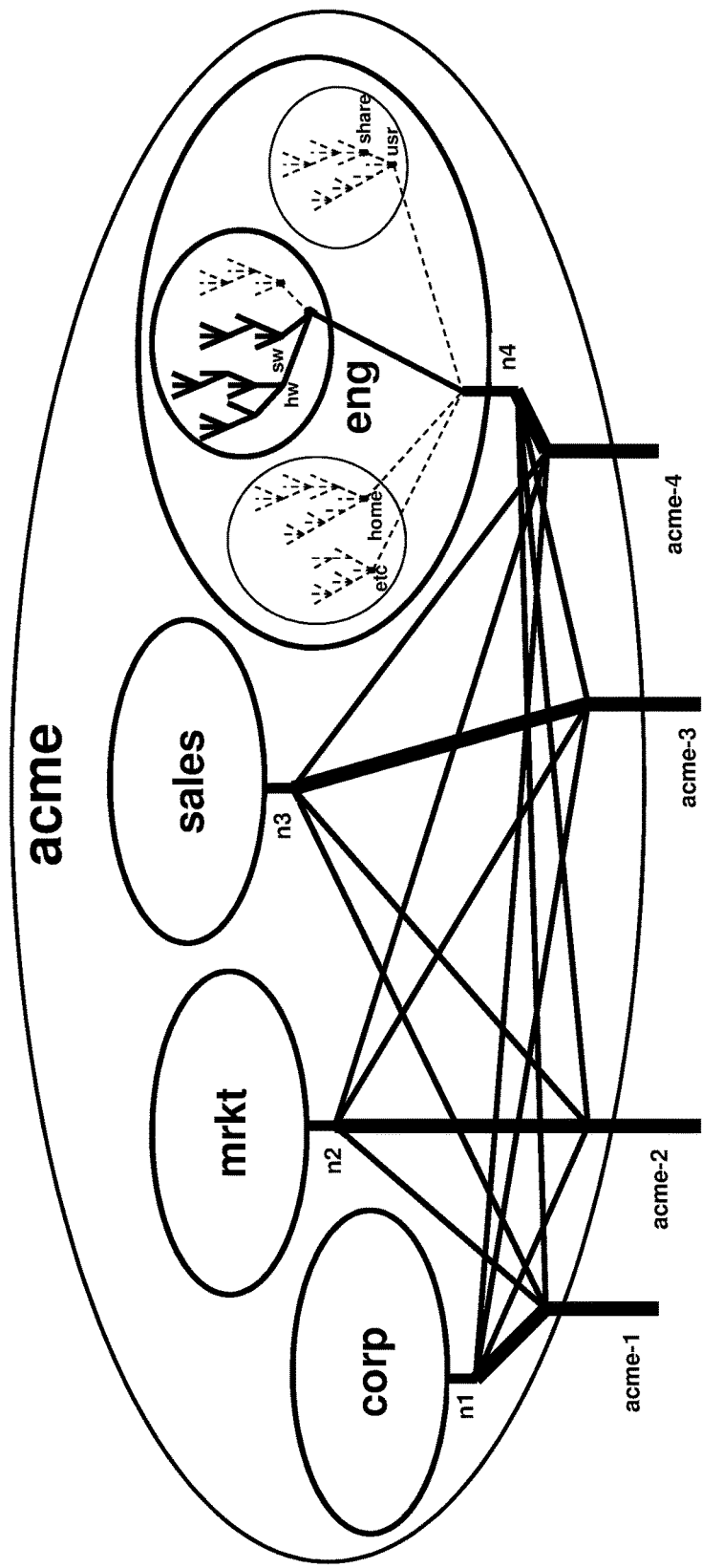
FIG. 6, illustrates the domain tree for node 1.

The initialization process for a DDS node occurs in two phases:
- Phase 1—Site initialization. (Refer to FIG. 3 and FIG. 5) The site map file (/etc/dds_exports) is read to determine the exported filesystems and the policy attributes associated with each exported filesystem. On a per filesystem basis, the policy attributes provide the default policies associated with every file within the filesystem. Default policies can be overridden by directory level and/or file level policy attributes.
- FIG. 3, depicting the site map file for node 4, specifies that the node will export a filesystem with the branches /export/eng/hw and /export/eng/sw, both with the same policy attributes of "*(rw,sync,wdelay,root_squash)". FIG. 5 illustrates the export filesystem (site tree) constructed by acme-4 by following the directions contained in the site map file. FIG. 5 also shows portions of acme-4's filesystem not being exported; they are interconnected with dashed lines instead of solid lines.
- Phase 2—Domain initialization. (Refer to FIGS. 4 and 6) After DDS site initialization completes, DDS checks for the presence of a domain map file (/._dds_./._site_./._control_./._map_.). If present, this file informs the DDS instance that it is a domain manager and it also specifies the name of the domain, the names of all sub-domains and the names of all sub-domain managers.
- FIG. 4 is the domain map file for the acme domain depicted in FIG. 1 and FIG. 6 illustrates the acme domain constructed by each node configured with that domain map file.
- Having discovered their domain map files, each DDS node constructs the acme domain tree by requesting from each sub-domain node the root of that node's domain tree. The returned roots are then grafted onto the root of the host node's domain tree.
- Referring to FIG. 6, the acme domain contains the sub-domains corp, mrkt, sales and eng. The eng sub-domain shows additional detail (the site tree exported by node 4), but the respective site trees of the other nodes are not depicted. The acme domain has four portals (acme-1, acme-2, acme-3, acme-4 hosted respectively on nodes 1 through 4), and each portal has a path to every sub-domain.

Note that the site map file specifies what is exported, but not what it is called. The domain map file (FIG. 4) specifies that n4 (private name for node 4) supplies the eng sub-domain, but it is the site map file (FIG. 3) that defines what node 4 will export under the name eng. So, the pathname employed by a user on a client workstation to access an acme hardware engineering document would look something like: /dds/acme/eng/hw/the_document.doc.

After each DDS node completes constructing its domain tree it is open for business. The multi-homed virtual file server acme may now be accessed through any of it four network interfaces. The top level directory structure of the acme's exported domain tree is:
/dds/acme/corp/ . . .
/dds/acme/mrkt/ . . .
/dds/acme/sales/ . . .
/dds/acme/eng/ . . .

Clients may now direct their requests to any acme portal and expect to receive the same response.

During Phase 2, domain initialization, a DDS node constructs a global namespace that includes its exported filesystem and the exported filesystems of all of its sub-domains. Following initialization, the DDS node is a file access portal to all files and directories contained within the domain's global namespace. The DDS node may also be bound into a larger domain as a sub-domain of a 'higher level' domain. This process may be recursively repeated until there is a single Internet domain that encompasses content from thousands or millions of origin servers distributed throughout the world.

Using the process described above to construct the multi-homed acme domain, thousands of DDS nodes may initialize to become Internet domain managers (portals). So, a portal located anywhere in the world may provide access to content distributed about the globe.

DDS Global File Services

DDS employs extensive file level hierarchical caching to make data appear to be 'here' rather than 'there'. From a filesystem perspective, a phrase that encapsulates DDS's primary focus is DDS removes the distinction between local files and remote files.

The distinctions removed are:
- Latency and Bandwidth—an image of the file is cached locally and therefore can be accessed al "local" speeds.
- Consistency—read operations always return the most recently written data.

Security—file data flowing and cached within DDS networks is encrypted and the content owner maintains complete control over its content throughout the distribution network. All DDS portals faithfully follow the content owner's instructions (which are attached to the content as policy attributes) with regard to providing access to unencrypted content.

Availability—DDS may be used to construct resilient networks and file servers. Redundancy can be woven into the DDS fabric to create always-available networks, and redundancy incorporated into file servers can ensure the continuous availability of file data. DDS transparently overcomes network failures whenever redundant paths make it possible to do so.

Protocol—DDS appears to be just another local filesystem, using the same filesystem API as native local filesystems. DDS extends the native filesystem API to provide a remote file access capability that is almost indistinguishable from the access capabilities afforded to local files.

DDS Terminology

The following list of words and phrases used throughout this document have the following definitions:

channel, integrated channel—In the context of a single DDS node, a channel is DDS's main data structure for representing a remote file and all information related to that file. The channel data structure contains a number of smaller data structures either directly or indirectly (by containing a reference to the smaller data structure). The file attributes data structure and the file data extent structures are referenced by the channel using memory address pointers.

In the context of a client terminator site communicating across the network with a server terminator site (possibly through several intermediate sites), channel refers to the channels at the individual sites bound together by DDS Protocol into a single integrated channel.

NOTE: When an application, executing on a DDS configured origin server, is accessing a file within the origin server the channel for that file will simultaneously fulfill the roles of both client terminator site and server terminator site. A channel does not always span multiple DDS sites.

file data extent—a contiguous memory segment that holds file data. The size of the file data extent is set following a negotiation with a downstream site when the channel is created. The file data extent structure contains a shadow pointer, which is the memory address of a contiguous memory segment (the shadow extent) of the same size as the file data extent.

policy attributes—file attributes attached to a file by a domain manager as the file's data is sent upstream in the response to a file access request. At upstream sites, these attributes, associated with the file in the same manner as the file's "normal" attributes, instruct the upstream site on the procedures required for granting access, performing decryption and all other file handling operations. (Only the upstream sites that have been authenticated by a downstream site will be trusted by the downstream site.)

external request—a file access request using a file access protocol other that DDS. NFS, CIFS, UFS, EXT4 and NTFS are examples of external requests. Note that NFS and CIFS are network protocols and the others are "local" protocols (used when DDS is installed on the system generating the request).

internal request—a file access request using the DDS protocol. Internal requests are internal to DDS and flow exclusively between DDS sites. Internal requests use the DDS protocol.

client terminator site or client terminator—The DDS site that receives an external request from a client.

server terminator site or server terminator—The DDS site "closest" to the origin file server. When the origin server is DDS configured the server terminator site is the origin server. In other cases, the server terminator communicates with the origin server using a network protocol such as NFS or CIFS.

intermediate site—A DDS site in the chain linking the client terminator site to the server terminator site.

client system, client computer or just client—In the context of DDS processing a request, the client is the computer system that dispatched the external request to the DDS client terminator site.

upstream site—When two DDS sites are communicating, the site "closest" to the client is the upstream site.

downstream site—When two DDS sites are communicating, the site "closest" to the origin server is the downstream site.

client-side—With respect to any point along the integrated channel path from server terminator to client terminator, client-side refers to everything on the client side of that point.

server-side—With respect to any point along the integrated channel path from server terminator to client terminator, server-side refers to everything on the server side of that point.

origin file server or origin server—The file server exporting the filesystem containing the target file.

DDS site or DDS node—a DDS configured network node that provides a file proxy cache service.

DDS Operations

A single DDS module contains client-side code for requesting file data from an origin file server and server-side code that receives and responds to requests from "upstream" DDS sites. Within the DDS framework, "downstream" is towards the origin server and "upstream" is towards the client.

An overview of a typical DDS network operation is:

a client computer system issues an NFS file access request targeting a DDS portal, the request is received at the portal (a DDS configured Linux system) and routed to an nfs daemon (the native NFS server code), the NFS server code executes a read system call to read file data, the Linux vfs layer routes the system call into the DDS module (which has registered as a local filesystem), the call's file identifier parameter is used to identify and connect to a channel (DDS's main data structure for representing a file and all information related to that file), the channel is examined to determine if all data required to respond to the system call is cached within the channel; if so, DDS responds to the system call; if not, . . .

the channel is examined to determine the origin file server's identity, if the origin server is this node, DDS executes a read system call to fetch whatever additional file data is required from the underlying native filesystem to respond to the request from the NFS server code, if the origin server is some other node, DDS generates and dispatches a DDS_LOAD request targeting a downstream DDS site "closer" to the origin server, the DDS_LOAD request may ripple through multiple DDS intermediate sites (executing essentially the same procedure as outlined above) before arriving at the DDS server terminator site, DDS executes a read system call to fetch whatever additional file data is required from the underlying native filesystem to respond to the request from an upstream DDS site, the response propagates back upstream and eventually arrives at the DDS client terminator site, the file data contained in the response is attached to the channel structure, all data required to respond to the NFS system call is now cached within the channel, so DDS responds to the call from the NFS server code, the NFS server code responds to the request from the client computer system.

DDS Protocol

The DDS protocol defines two remote procedures for transporting file data: DDS_LOAD and DDS_FLUSH. These two procedures are briefly described since recovery operations are based upon variations of these procedures.

DDS_LOAD—This operation loads data and metadata from a downstream site. The request includes a file identifier and the flags (DDS_CC_SITE_READING, DDS_CC_SITE_WRITING) that inform the downstream site of the types of operations that will be performed upon the file data being loaded. These flags are used by the distributed consistency mechanism to keep track of the type of operations (read vs. write) being performed at upstream sites.

A single load or flush request may specify multiple file segments and each segment may be up to 4 gigabytes in length.

The response includes flags (DDS_CC_SUSTAIN_DIR_PROJECTION, and DDS_CC_SUSTAIN_FILE_PROJECTION) that indicate whether the returned file data and metadata may be cached or whether it must be discarded immediately after responding to the current client request.

DDS_FLUSH—This operation flushes modified file data/metadata to some form of stable memory. A flush level specifies how far the flush propagates. The currently defined levels are:

DDS_FLUSH_TO_STABLE_MEMORY—Flush to client terminator's flash memory

DDS_FLUSH_TO_DISK—Flush to client terminator's disk

DDS_FLUSH_TO_ORIGIN—Flush all the way to the origin server

In response to DDS_LOAD requests, the DDS server terminator site projects file data into remote DDS client terminator sites. These projections are sustained in the remote DDS sites while the file is being accessed at those sites unless a concurrent write sharing condition arises.

An upstream DDS cache buffer is no different than an internal origin file server buffer. After a write operation modifies a file system buffer (either local or remote), performance is enhanced if the buffer is asynchronously written to the server's disk. However, file modifications are safeguarded when they are synchronously written to disk or some other form of stable storage. Flush levels allow both the client and the server to express their level of paranoia. The more paranoid of the two usually prevails.

As disclosed in this document, an upstream DDS site flushes all of a channel's dirty data and metadata downstream as an atomic unit. When the amount of dirty data is more than can be accommodated in a single network operation, the downstream site remains "committed" to the upstream site until the last batch of data (flagged with DDS_FLUSH_DATA_COMPLETE) is successfully received. This means that the channel at the downstream site will not service a request from any other upstream site until the flush has completed.

This works fine as long as everything else works fine. But, when two sites get partitioned in the midst of a multi-transfer flush operation, the client-side and the server-side will both attempt to overcome the failure. But, at some point the server-side may decide (based on its current policies) to cut off the isolated upstream site and continue providing file access services to its other client systems. In this case, the flush operation is less than atomic. And this is unacceptable because file modifications must be atomic at all times and under all circumstances.

Within DDS each file extent structure contains a pointer to a shadow extent, and each attribute structure contains a pointer to a set of shadow attributes. When a multi-transfer flush is processed at a downstream node, all incoming data is routed into these shadow structures. Then, when all dirty data (extents and attributes) has been received at the downstream site, the shadow structures are promoted to reality in an atomic operation and the 'old' structures are released. Of course, when the multi-transfer flush does not complete successfully, all shadow extents and the shadow attributes must be discarded.

At an upstream node, when DDS flushes a channel, each dirty extent (flagged with X_DIRTY) is flagged with X_FLUSHING. If the flush operation does not complete successfully, DDS resets all X_FLUSHING flags. And, of course, when the operation is successful both the X_DIRTY and X_FLUSHING flags are reset.

The DDS client-side node processes a multi-transfer flush operation in an atomic manner. Once the channel has been acquired and the first batch has been accepted at the downstream site (as opposed to rejected because of a consistency operation), it will not be released until the last batch has been dispatched. And when released, the channel will either be clean (successful flush) or it will be just as dirty as it ever was.

In addition to the two remote procedures used to move file data up and down the wire, DDS also defines:

DDS_CONNECT for establishing a connection to a filesystem (equivalent to an NFS mount operation) or a connection to a directory or a file, DDS_NAME creates, modifies and deletes file/directory names and links, DDS_CTRL provides various capabilities required to actively monitor the health of DDS domain nodes and to support the DDS consistency mechanism. The two DDS_CTRL procedures that support DDS's distributed consistency mechanism are:

fast ping—dispatched frequently by a DDS client site to ensure that is still in communication with a downstream site. The fast ping rate brackets the amount of time that a client site can operate before becoming aware that it is disconnected from its downstream counterpart. This rate is typically set to about one second, but could be much higher when DDS nodes are interconnected with extremely fast links and/or shared memory.

A downstream site is fast pinged only when there has been no other communication with the site for the amount of time specified by the fast ping rate. Any successful message exchange with a downstream site serves the purpose of a fast ping.

slow ping—issued by a DDS client site as a "self-addressed stamped envelope" (SASE) that the DDS server-side node uses when it wants to deliver a consistency notification message. The server-side node will not respond to this request until it has a notification it wants delivered to the DDS client node. Thus, the name "slow ping".

slow ping is the means by which DDS implements a callback mechanism for consistency control operations.

I. DDS Network Operations

This section presents a simplified overview of DDS network communications.

DDS nodes communicate using multi-threaded SUNRPC remote procedure calls over TCP/IP connections. For every successful remote procedure call there is a client making the call and a server responding to the call. SUNRPC & TCP/IP have built in mechanisms to reliably transport requests and responses across a network. DDS, layered on top of the SUNRPC and TCP/IP combination, depends upon this protocol stack for reliable message delivery.

Every DDS remote procedure call issued eventually returns with an indication of the status of the call.

RPC_SUCCESS indicates that both the request and the response were successfully transported across the wire.

RPC_TIMEDOUT indicates that a response was not received. This occurs when a network link or node (including a DDS node) has gone offline or failed. When alternate paths make it possible to still access the source file, the upstream DDS node (client-side) re-routes and re-issues the request to transparently overcome the network failure.

Other RPC_XXXX error codes should not occur. But, when they occur some administrative action is probably required.

High Level View of Network Failures

From a workstation or a DDS client node's perspective a component failure manifests itself as a failure to respond to a request. To the DDS client node it does not really matter whether a router, switch, intermediate DDS node or a server component failed. What does matter is that the client issued a request and did not receive a response. An "industry standard" NFS client would, in this circumstance, keep re-issuing the same request until the server responded and then the client would proceed as normal. (A DDS client is more proactive in this situation, and this is described later.)

There is a class of failures referred to as a network partition event, where both DDS client-side nodes and server-side nodes remain operational, but the failed component, has isolated the client-side from the server-side. When a network partition event occurs, the client-side and server-side components assume very different roles.

The server-side's main priority is to ensure the integrity of all file data and then to continue providing file access services to clients still able to communicate with the server.

The client-side's priorities are: a) to safeguard file modifications that have not yet been successfully flushed to the origin server; b) to re-establish communication with the server and immediately flush all files 'crossing' the partition; and c) to continue providing file access services if possible.

So each side plays a different role during a partition event. However, each role is tempered and shaped by DDS domain policy attributes. These attributes provide instructions for handling file data, processing file access requests, and responding to failures. The following section, Centralized Control over Distributed Operations, describes how policy attributes are employed to exercise centralized control over geographically distributed DDS overlay networks.

Centralized Control Over Distributed Operations

Whenever a DDS origin server responds to a file access request, the file's policy attributes are fed into the DDS distribution network as a class of metadata associated with the file data throughout the network. Every DDS node faithfully adheres to all policies specified by the file's policy attributes under all circumstances. (Of course, DDS nodes employ standard authentication methods to ensure that secured data is only sent to nodes that can be trusted.)

File metadata, including policy attributes, is provided with the same level of consistency as regular file data. Therefore, a metadata read operation (to fetch file attributes and/or policies) at any DDS site will return the most recently written metadata. This means the policies for handling a file or a group of files can be changed instantly throughout the network.

II. Network Failure Recovery

DDS Failure Recovery Building Blocks

DDS network operations incorporate the following features and characteristics designed to facilitate the transparent recovery from network component failures:

1. Network Transactions

A DDS node communicates with other DDS nodes at the network transaction level. A network transaction, usually consisting of a single request-response interaction, uses whatever number or remote procedure calls are required to complete an atomic DDS operation. For example, some DDS_FLUSH operations require multiple request-response interactions to perform a flush as an atomic DDS operation.

At the completion of any network transaction, the server-side DDS channel targeted by the request either "steps completely forward" to a new state or it remains unchanged from its original state.

At the completion of any network transaction, the client-side DDS channel issuing the request either "steps completely forward" to a new state or it remains unchanged from its original state.

2. Idempotent Operations

DDS servers incorporate a duplicate request cache (DRC) that enables the server to receive the same request multiple times and to ensure all responses will be the same as the first response.

Note that the network transaction feature ensures that each DDS node either "does" or "completely does not" respond to a client request. But it is possible, even likely, that the server can "do" while the client-side "completely does not" because a network failure prevented the delivery of the response. DDS's idempotent operations feature provides a graceful (and transparent!) method for the client-side to catch up with the server-side.

3. Recursive Ascent Failure Notifications

FIG. 7, depicting a simple hierarchy 700 of DDS nodes configured with multiple routes from node A to the origin server node (node S), assumes the following scenario for illustrative purposes:

node A has dispatched a DDS_LOAD request to node C, causing node C to dispatch a DDS_LOAD request to node F, causing node F to dispatch a DDS_LOAD request to node S, but the link to node S has failed.

FIG. 8 is a flowchart illustrating an example of a method 800 of recursive ascent failure notifications. The method 800 can be used in a hierarchy 700 of FIG. 7. In the method 800, a failure notification (DDS_BAD_LINK) percolates up to a higher level only after the reconnect efforts at the current level failed to re-establish a downstream connection.

FIG. 8 shows that the method 800 can include declaring 802 a network failure. I.e., the DDS client node whose immediate downstream link has stopped responding is the site that declares 802 a network failure. For example, referring to FIG. 7, when the link from node F to node S fails while node C is attempting to load data from node S, node F will be the node that detects and declares 802 the network failure.

FIG. 8 also shows that the method 800 can include determining 804 if an alternate route is available. Determining 804 if an alternate route is available can include referencing network configuration data stored at the node that is declaring a network failure 802 or searching the directory tree for connections by other nodes to the target node. Additionally or alternatively, determining 804 if an alternate route is available can include communicating with other connected nodes to determine if a path to the target node exists. One of skill in the art will appreciate that such a request does not include a request to the originating node. I.e., node F of FIG. 7 will not search for an alternate path through node C, which sent the data request to node F.

FIG. 8 further shows that the method 800 can include reporting 806 an error code if an alternate route is not available. E.g., since node F has no alternate routes to node S, node F will respond to node C's DDS_LOAD request with and error code of DDS_BAD_LINK. Now, node C attempts to reconnect on an alternate path (node E in FIG. 7) and if it fails to do so, node C will respond to node A with a status of DDS_BAD_LINK. I.e., node C will complete the same method 800 being utilized by node F. Finally, node A will attempt to reconnect on an alternate path and if it fails to do so, it will respond to its client with a status of DDS_BAD_LINK.

FIG. 8 additionally shows that the method 800 can include re-establishing 808 the file connection over the alternative route if found. I.e., since node F has no alternate working route to node S, it responds to node C with DDS_BAD_LINK. Node C then attempts to re-establish a file connection 808 to node S through node E.

Finally, FIG. 8 shows that when the attempt to re-establish a file connection 808 is successful, node C re-sends 810 the same DDS_LOAD request to node E that was originally sent to node F. If node E responds with DDS_OK, node C will respond to node A with DDS_OK.

One of skill in the art will appreciate that once node C originally dispatched it's DDS_LOAD request (which it had generated in response to having received a DDS_LOAD request from node A), node C was willing to wait for node F to respond because node C's fast pings kept reassuring it that node F and the link to it were both operational.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

4. Atomic Flush Transactions

For all DDS network requests except DDS_FLUSH, a DDS channel "steps forward" one request-response cycle at a time. At any point in time, the external view of a channel's state transitions from its state before a request is processed to its state after the request is successfully processed in an atomic manner. The external view (as opposed to internal view which is what the code processing requests "sees") of a channel's state will never reflect a partially completed network request. It will reflect the channel's state either before or after a request has been processed, and never anything in-between. A channel may be required to engage with its downstream channel, but, if so, this communication constitutes a separate request-response transaction.

However, to maintain the highest levels of file consistency whereby each DDS request either "happens completely" or "does not happen at all", DDS flushes are atomic and synchronous from the DDS client terminator site all the way through to the origin filesystem. For large multi-transfer flushes, intermediate nodes may be simultaneously forwarding transfer n while receiving transfer n+1.

An upstream node does not consider a flush successful until it receives a DDS_OK response with the ALL_DATA_RECEIVED response flag also set. Flush data is maintained in shadow extents at upstream nodes until the upstream node receives confirmation that the origin filesystem has successfully received all flush data. For large multi-transfer flushes, each transfer flows through intermediate nodes independently of the other transfers. All nodes store the received flush data in shadow extents. When the server terminator site receives the last flush transfer (DATA_COMPLETE request flag is set), it writes all received flush data to the origin filesystem. After receiving confirmation that the write was successful, the server terminator site replaces all extents that have shadow extents with their shadows and then dispatches a DDS_OK response with the ALL_DATA_RECEIVED response flag also set back upstream. As the response propagates through each intermediate node, each node also promotes its shadow extents.

Figure 9:
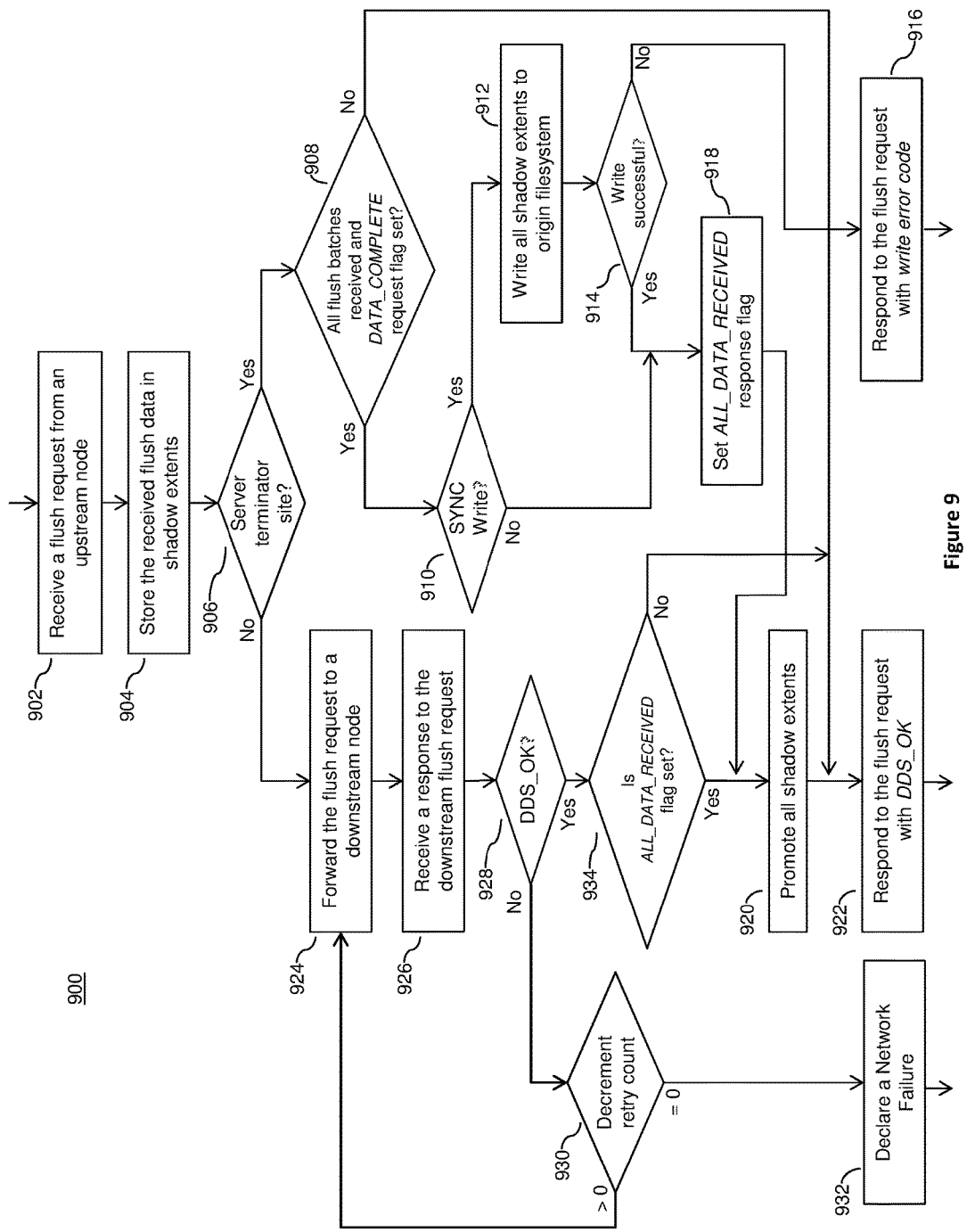
FIG. 9 is a flowchart illustrating an example of a method of atomic flush transactions.

FIG. 9 is a flowchart illustrating an example of a method 900 of atomic flush transactions. In the method 900 DDS flushes are atomic and synchronous from the client terminator site to the server terminator site.

FIG. 9 shows that the method 900 can include receiving 902 a flush request from an upstream node. I.e., modified file data/metadata is received 902 with the intent that the modified file data/metadata is saved to some form of stable memory, as described below.

FIG. 9 additionally shows that the method 900 can include storing 904 the received flushed data in shadow extents. I.e., the data received 902 in the flush request from the upstream node is stored in shadow extents.

FIG. 9 also shows that the method 900 can include determining 906 if this site is the server terminator site.

When this site is the server terminator site, FIG. 9 shows that the method 900 can include determining 908 if all batches of the flush (multi-transfer flushes have more than one) have been received and the DATA_COMPLETE request flag was set in one of the requests. (Note that it is not uncommon for network requests to be received and/or processed out of sequence with respect to when they were dispatched by the upstream node.)

When all flush data has been received and the DATA_COMPLETE request flag is set, FIG. 9 shows that the method 900 can include determining 910 if synchronous writes are enabled for the file identified in the flush request and when synchronous writes are enabled, writing 912 all received flush data to the origin filesystem.

FIG. 9 then shows that the method 900 can include determining 914 whether the filesystem write operation completed successfully. When a write error occurs, FIG. 9 shows that the method 900 can include responding 916 to the flush request with a status that conveys the write error code.

When a write error does not occur or synchronous writes are not enabled for the file identified in the flush request, FIG. 9 shows that the method 900 can include setting 918 the ALL_DATA_RECEIVED response flag; promoting 920 the flushed data in the shadow extents; and responding 922 to the received flush request with a status code of DDS_OK. Furthermore, when the DATA_COMPLETE request flag is not set, FIG. 9 shows that the method 900 can include simply responding 922 to the received flush request with a status code of DDS_OK.

When this site is not the server terminator site, FIG. 9 shows that the method 900 can include forwarding 924 the flush request to a downstream node. I.e., the site forwards 924 the flush request to ensure that the flush request continues until it reaches the server terminator site.

FIG. 9 further shows that the method 900 can include receiving 926 a response to the flush request from the downstream node. I.e., because the flush request was forwarded 924, the site waits for confirmation that the downstream site (and all sites to which the downstream site forwarded the request) has responded to the flush request.

FIG. 9 further shows that the method 900 can include determining 928 if the response status is DDS_OK. I.e., the site determines 928 that the downstream site (and all sites to which the downstream site forwarded the request) has successfully completed the flush request.

When the response status is not DDS_OK (the flush request was not successfully processed downstream), FIG. 9 further shows that the method 900 can include decrementing 930 a retry count and, if the count is greater than zero, re-forwarding 924 the flush request along the same route as the previous request. However, if the retry count equals zero, FIG. 9 further shows that the method 900 can include declaring 932 a network failure, which will initiate a search for an alternate route to the server terminator site.

When the response status is DDS_OK, FIG. 9 further shows that the method 900 can include determining 934 if the ALL_DATA_RECEIVED response flag is set, indicating that the server terminator site has received and accepted all flush data.

When the ALL_DATA_RECEIVED response flag is set, FIG. 9 further shows that the method 900 can include promoting 920 the flushed data in the shadow extents. All extents that have shadow extents are replaced with their shadows. I.e., the changes are made permanent and the data is no longer stored within a shadow extent. Any further access of the file will receive the updated file, rather than the pre-update file.

FIG. 9 additionally shows that the method 900 can include responding 922 to the received flush request with a code of DDS_OK. As the response propagates through each DDS node, each node also promotes its shadow extents if the ALL_DATA_RECEIVED response flag is also set. This ensures that each node is working from the same concurrent data. The response, therefore, propagates upstream until the originating node receives it, thereby becoming aware that the flush request has been completed successfully.

5. Distributed Consistency Mechanism

DDS's consistency mechanism is woven into the DDS Protocol. Every DDS file access request provides an indication of whether the client intends to modify the returned file data or just read it.

DDS implements an internal rule: a DDS client site must first inform its downstream DDS site before it performs a new type of activity (read/write) on a file. So, for example, a client node that has previously fetched a complete file for reading cannot begin writing without first informing the downstream site that it intends to begin writing. This allows the server-side to detect the onset of a concurrent write sharing (CWS) condition and take whatever steps are necessary to maintain cache consistency before the client-side actually performs the write operation.

The consistency mechanism ensures that, at any instant, only a single DDS site is modifying a file. Therefore, at the moment when a site with dirty data (modified data) becomes partitioned from its downstream server-side counterpart, all other sites are guaranteed to not have any file modifications. The isolated site holds the most recent file modifications and all portals still connected to the server terminator site provide a consistent view of the file "just before" the latest (and now isolated) file write. The isolated site can flush the file modifications to any DDS site providing connectivity to the source file, including the server terminator site itself.

6. "Versioned" File Modifications 6.1. Validating a Cached File Image

Modern computer systems typically employ internal clocks with nanosecond or microsecond resolutions. When DDS code executes on any computer system other than the origin server, the clock used by remote DDS nodes cannot be synchronized with the clock used by the origin filesystem's code to the level of precision required to support standard filesystem operations. So, filesystem timestamps may only be set at the origin server site.

DDS file access responses always include the target file's attributes, which are cached and stored in association with the file's data. The file's last modification timestamp, a file attribute element, is used as a version number for cached images. At DDS sites the cached image of a file's last modification timestamp may be referred to as the file's version number. The two are the same. The differing nomenclature relates to how the attribute is interpreted and used at DDS sites.

Upstream DDS sites use a file's timestamp (a file attribute), the timestamp arrival time and a delta time to generate and maintain projected timestamps. Projected timestamps, which enable DDS upstream sites to operate autonomously (the main point of file caching), are temporary timestamps that are replaced with (upgraded to) genuine filesystem timestamps whenever a server terminator site accesses file data in the origin filesystem.

The elements of a projected timestamp are:
timestamp a cached image of a file timestamp (for Unix-like systems: atime—time of last access, mtime—time of last modification, ctime—time of last status change),
timestamp arrival time—the time at which a particular timestamp is received in a response from a DDS downstream site, and
delta time—the difference between the current time and the timestamp arrival time.

Filesystems native to Unix-like systems typically maintain three timestamps for each file:
a_time—time of last access,
m_time—time of last modification, and
c_time—time of last status change.

DDS upstream sites generate projected timestamps for each of these filesystem timestamps and therefore maintain three arrival times and three delta times: a_arrival/a_delta, m_arrival/m_delta and c_arrival/c_delta. The description of projected timestamps in the remainder of this document focuses on the generation of projected timestamps for the time of last modification. However, similar methods are used to generate projected timestamps for a_time and c_time.

When a response to a flush request with status DDS_OK is received and processed, the last modification timestamp contained in the response becomes the version number, the m_arrival time is set to the current time, and the m_delta time is set to zero. Whenever a response to any other type of DDS file access request is received, the version number is compared with the cached one. When they differ, the client knows the file has been modified at some other site and its image is no longer valid.

Figure 10:
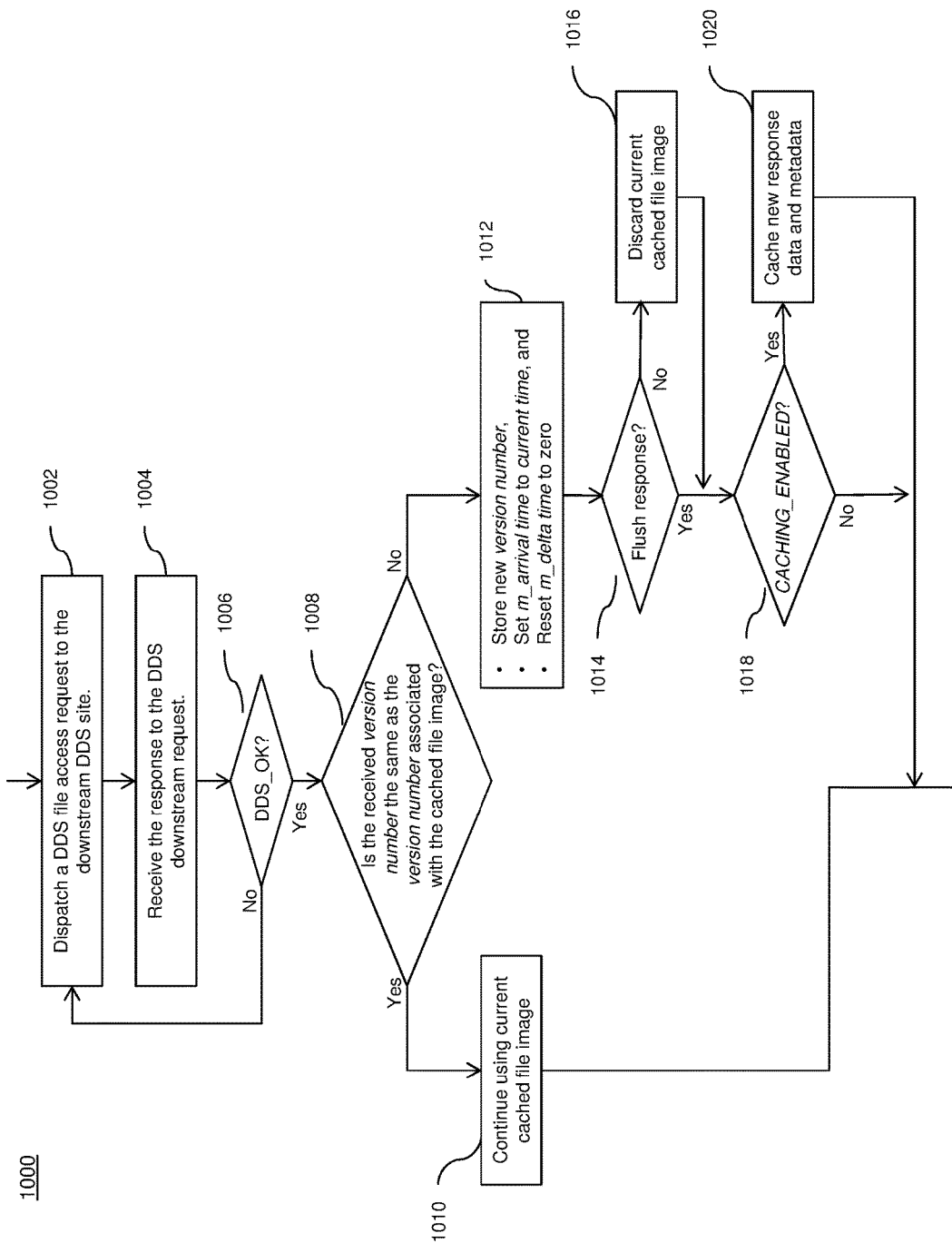
FIG. 10 is a flowchart illustrating an example of a method of validating a cached file image when a response received at an upstream site contains the same version number as the one associated with the cached file image.

FIG. 10 is a flowchart illustrating an example of a method 1000 of validating a cached file image when a response received at an upstream site contains the same version number as the one associated with the cached file image; and invalidating the cached file image, storing the new version number, setting the m_arrival time to the host system's current time, and resetting the m_delta time to zero when a response contains a different version number than the one associated with the cached file image.

FIG. 10 moreover shows that the method 1000 can include dispatching 1002 a DDS file access request to the downstream DDS site. I.e., the node sends a request to read, write, save, etc. a file from a downstream site.

FIG. 10 also shows that the method 1000 can include receiving 1004 a response to the DDS downstream request. I.e., the node receives any response from the downstream site, regardless of whether the access was successful or not.

FIG. 10 further shows that the method 1000 can include determining 1006 if the DDS request was processed without any errors and the response status is therefore DDS_OK. And, when there is an error, that the request is repeated. However, what is not depicted is that after a few unsuccessful re-attempts the upstream site will declare a network failure and may begin searching for an alternate route to the DDS server terminator site.

FIG. 10 further shows that the method 1000 can include determining 1008 whether the received version number is the same as the version number associated with the cached file image. Note that the response to any successful DDS file access request (response status is DDS_OK) conveys the file's attributes, which include the version number (m_time, the last modification timestamp).

FIG. 10 also shows that the method 1000 can include continuing to use 1010 the current cached file image (revalidating the current file image) when the received version number is the same as the version number associated with the cached file image. I.e., because this site is using the current version, the current file image is revalidated and is continued to be used.

FIG. 10 additionally shows that when the received version number is not the same as the version number associated with the cached file image, the method 1000 can include storing 1012 the new version number, setting the m_arrival time to the host system's current time, and resetting the m_delta time to zero.

FIG. 10 further shows that the method 1000 can include determining 1014 whether the response is a flush response. And when the response is not a flush response the method 1000 can include discarding 1016 the current cached file image. A DDS flush request flows through to the origin file server in a single atomic operation and the response returns the last modification timestamp as the file's version number. So, a file's version number always changes when a flush response with a status of DDS_OK is received. (When the version number changes on any other response, the file has been modified at some other site and the cache image at this site is therefore not current and must be discarded.)

FIG. 10 further shows that the method 1000 can include determining 1018 if the response has the CACHING_ENABLED flag set and caching 1020 any new response data and metadata when the CACHING_ENABLED flag is set.

6.2. Flushing a Modified File Image

Upstream DDS sites provide better (faster) write performance when client file modifications are captured at the site and not immediately flushed downstream. "Collecting" many client file modifications before sending a "batch flush" downstream employs the underlying network infrastructure far more efficiently and provides a more responsive file access service to the client. However, when a DDS client terminator site acknowledges a client write request before the new data has been successfully flushed downstream, the possibility arises that a future network failure could cause the new data to be lost.

DDS provides a distributed file service and is therefore always balancing performance against filesystem integrity. Performance is increased when DDS client terminator sites operate autonomously, but the risk of losing file modifications is also increased. Both the administrator and the user can set or adjust policies affecting this balancing act.

The most risk adverse policy instructs client terminator sites to immediately forward file modifications on to the server terminator site and to not respond to a client write request until the origin server acknowledges the successful receipt of the new data. This mode, referred to as synchronous writes, traverses the full network path from client application to origin server on every write operation.

More risky, performance oriented policies allow file modifications to be aggregated and batch flushed. This mode is often referred to as delayed writes. Generally, a timer, controlled by policy, initiates batch flushes in this mode of operation.

When modified file data is flushed, the file data flowing downstream includes the version number. It will be the same as the version number at the DDS server terminator site and all intermediate DDS nodes unless some previous network partition event prevented consistency control messages from being delivered.

Once a DDS client site detects that it is isolated from its server-side companion (it employs fast pings to detect this quickly), it immediately invokes procedures to re-establish communication with a DDS node still "connected" to the server terminator site. Once the isolated, and now paranoid, node reconnects, it usually begins immediately flushing all dirty file images.

Each flush request is tagged with the cached file image's version number. Whenever a DDS node processes a flush request, it compares the version number in the flush request with the version number associated with its cached image of the file identified in the flush request. When there is a mismatch the flush is rejected and sent back to the client with an error code of OUT_OF_SEQUENCE. This error code is then returned to the client application, which will have to resolve this issue.

Version numbers will usually match and the incoming file modifications will be accepted. However, when a substantial amount of time passes while the client node is processing file requests using only cached file image data (no communication with the downstream site), the likelihood of a version mismatch increases. Of course, when a DDS site processes file requests independently of its downstream site, it is relying upon DDS's consistency callback mechanism for immediate notification when a concurrent write sharing condition arises and it is relying on fast pings to continually reassure itself that the callback path is operational.

Figure 11:
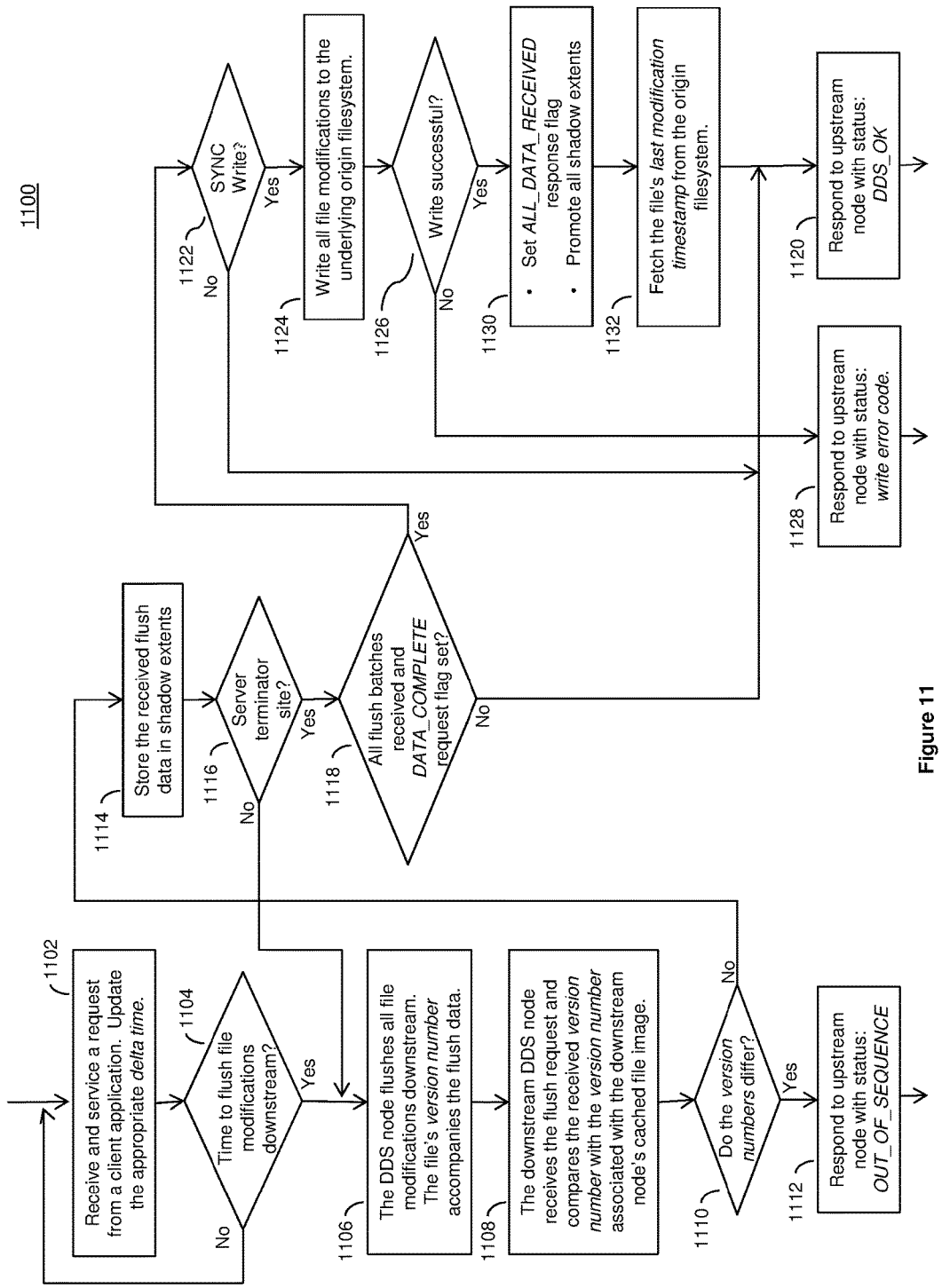
FIG. 11 is a flowchart illustrating an example of a method of flushing modified file data downstream towards the DDS server terminator site.

FIG. 11 is a flowchart illustrating an example of a method 1100 of flushing modified file data downstream towards the DDS server terminator site; re-validating the modified file data at each DDS site; and, when all flush data has arrived at the server terminator site, possibly writing all file modifications to the origin filesystem and then fetching the file's last modification timestamp.

FIG. 11 shows that the method 1100 can include receiving and servicing 1102 a request from a client application and updating the appropriate delta time, which is m_delta for write requests, a_delta for read requests and c_delta for requests that modify the file's attributes.

FIG. 11 also shows that the method 1100 can include determining 1104 if it is time to flush file modifications downstream. If it is not time to flush the file modifications downstream, the site continues to service client file access requests. When synchronous writes are being used for the file identified in the request, it will always be time to flush the modifications downstream. For delayed writes, flushes may be initiated when a delay timer expires. The delay timer may be reset on every write request or every file access request. So, for example, a client terminator site might initiate a batch flush operation 15 seconds after receiving the last of many write requests.

FIG. 11 further shows that the method 1100 can include flushing 1106 all file modifications downstream. The file's version number accompanies the flush data.

FIG. 11 additionally shows that the method 1100 can include a downstream DDS node receiving 1108 the flush request and comparing the received version number with the version number associated with the downstream node's cached file image.

FIG. 11 moreover shows that the method 1100 can include determining 1110 if the version numbers differ. I.e., the version numbers are compared.

FIG. 11 also shows that the method 1100 can include the downstream DDS node responding 1112 OUT_OF_SEQUENCE to the upstream node if the version numbers differ.

When the version numbers are the same, FIG. 11 then shows that the method 1100 can include the storing 1114 the received flush data in shadow extents.

FIG. 11 further shows that the method 1100 can include determining 1116 if the downstream DDS node is the server terminator site. If the downstream DDS node is not the server terminator site then the steps 1106-1116 are repeated until the server terminator site is reached.

FIG. 11 also shows that when the flush request is processed at the server terminator site, the method 1100 can include determining 1118 that all requests in this flush operation have been received and that one of the requests had the DATA_COMPLETE request flag set.

When not all requests in this flush operation have been received with one of the requests having the DATA_COMPLETE request flag set, FIG. 11 shows that the method 1100 can include responding 1120 to the upstream node with a status of DDS_OK.

FIG. 11 additionally shows that the method 1100 can include determining 1122 whether synchronous write mode is being used for the file identified in the request. When synchronous write mode is not being used, FIG. 11 shows that the method 1100 can include responding 1120 to the upstream node with a status of DDS_OK.

When synchronous write mode is being used, FIG. 11 shows that the method 1100 can include writing 1124 all file modifications to the underlying origin filesystem.

FIG. 11 further shows that the method 1100 can include determining 1126 whether the write to the origin filesystem was successful. When the write to the origin filesystem is not successful, FIG. 11 shows that the method 1100 can include responding 1128 to upstream node with a status that indicates the type of error that occurred.

When the write to the origin filesystem is successful, FIG. 11 shows that the method 1100 can include setting 1130 the ALL_DATA_RECEIVED response flag and replacing all extents that have shadow extents with their respective shadow extents.

FIG. 11 then shows that the method 1100 can include fetching the file's last modification timestamp from the origin filesystem. This timestamp, which conveys the time (according to the origin filesystem clock) that the write 1124 was performed, will be interpreted at upstream sites as the file's version number.

FIG. 11 finally shows that the method 1100 can include responding 1120 to upstream node with a status of DDS_OK.

6.3. Generating Timestamps at Client Terminator Sites

When a client system (a workstation, for example) receives a response to a file write request, the response includes file's attributes, an element of which is the file's last modification timestamp. For synchronous writes, this timestamp will be the correct timestamp generated by the origin filesystem when it received the new file modification. However, when delayed writes are employed for faster performance and the DDS client terminator site is operating autonomously, the DDS instance executing at the client terminator site generates the response's last modification timestamp as follows:

last modification timestamp=version number+m_delta time;

where:

m_delta time=current time—m_arrival time.

The version number is the origin server's last modification timestamp and only the origin server updates it. Upstream sites use the last modification timestamp as the file's version number. Every file modification performed by the origin server creates a new file version.

The timestamp generated by the client terminator is a temporary timestamp that is accurate enough to enable the client application to believe it is accessing the most current version of the file (which, in fact, it is). The timestamp monotonically increases by a reasonable amount on every file modification request and it is periodically resynchronized (whenever dirty file data is flushed downstream) with the origin server's timestamp. This behavior helps to maintain the illusion that the DDS service is provided by a single local filesystem "within" the computer where the client application is executing.

Similar procedures may also be used to project other temporary filesystem timestamps such as a file's last access timestamp and last change timestamp.

7. Path Signatures

The path signature, included in some DDS responses, defines the current route back to the origin server. Path signatures have the following structure:

```
typedef struct dds_path_signature {
    int     n_hops;              // number of DDS hops to server site
    long    node_signature[16];  // 4 byte node identifier of a DDS node
} DDS_PATH_SIGNATURE;
```

Whenever an upstream DDS node receives a successful connection response (DDS_OK status and the INITIAL_FILE_CONNECTION response flag is set), the path signature contained within the response is copied into the channel.

During the course of processing a request from an upstream site currently not connected to the target file, the downstream site will establish a connection to the upstream site and then include in its request response a path signature constructed by adding its signature to the channel's path signature.

At any instant, a channel's path signature reflects the last successful path used to access file data.

When a network failure occurs DDS initiates procedures to re-establish a connection to a file. A client-side node will successively direct a reconnection request down each of its alternate paths to the origin server; stopping as soon as one of the reconnection attempts is successful. After trying all paths without successfully reconnecting to the file, the client-side node will return the DDS_BAD_LINK error code to the client that was accessing the file when the failure was discovered.

A reconnection request, which is a DDS request with the DDS_RECONNECT flag set, contains the channel's path signature. The server-side node receiving and processing the request uses the path signature to recognize the client as a current client and to reconcile its consistency control data structures. So, for example, when a writing client reconnects, the server-side node does not "see" a second writer and declare a concurrent write sharing condition. It "sees" a client that has been modifying a file now attempting to access the file through a new path.

A reconnection request propagates downstream until a node recognizes that its signature is contained in the path signature. If this node is more than one level lower in the cache hierarchy, the upstream nodes along the previous path must be informed so that the old path's consistency control structures can be reconciled.

A reconnection request may also be issued when there is no network failure. An upstream node, deciding to re-balance its downstream traffic, may issue a reconnection request at any time.

7.1. Path Signature Upstream Propagation

Figure 12:
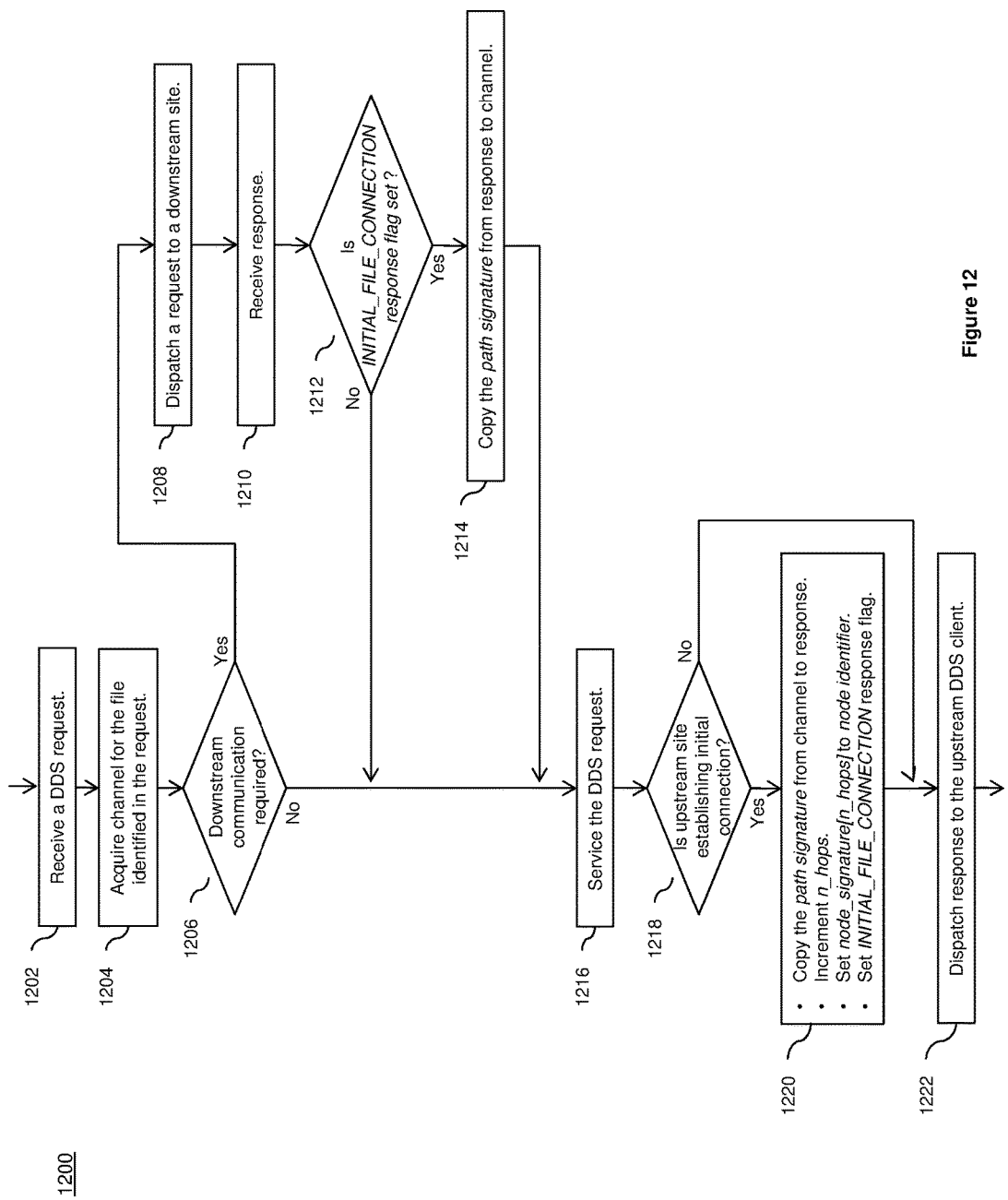
FIG. 12 is a flowchart illustrating an example of a method employed by a DDS node to load a path signature when a connection is established.

FIG. 12 is a flowchart illustrating an example of a method 1200 employed by a DDS node to load a path signature when a connection is established; and for that node to add its signature to the path signature that it sends upstream whenever an upstream node establishes a file connection.

FIG. 12 illustrates that the method 1200 can include receiving 1202 a DDS request. I.e., a DDS request is received from an upstream node.

FIG. 12 also shows that the method 1200 can include acquiring 1204 the channel for the file identified in the request. When the channel does not already exist, a new channel is created and assigned to the identified file.

FIG. 12 further illustrates that the method 1200 can include determining 1206 if it is possible to service the request without communicating with the downstream node. This would be the case when all required file data is cached and valid at the site, and the channel at this site is already "connected" to a downstream site or this site is operating in disconnected mode.

When a downstream communication is required, FIG. 12 also shows that the method 1200 can include dispatching 1208 a request to a downstream site and then receiving 1210 a response from the downstream site.

FIG. 12 then shows that the method 1200 can include determining 1212 if the response contained an indication that the downstream site just established a file connection to this site.

When the downstream site indicates that it has just established a file connection to this site, FIG. 12 shows that the method 1200 can include copying 1214 the path signature from the response to the channel.

When 1206 determines that a downstream communication is not required, FIG. 12 shows that the method 1200 can include servicing 1216 the request.

Then FIG. 12 illustrates that the method 1200 can include determining 1218 if the upstream site that sent the request now being processed is establishing an initial file connection.

When the upstream site is establishing an initial file connection, FIG. 12 shows that the method 1200 can include copying 1220 the path signature from the channel to the response, adding this node's signature to the response's path signature, and then setting the INITIAL_FILE_CONNECTION flag in the response.

Finally, FIG. 12 shows that the method 1200 can include dispatching 1222 a response back to the upstream DDS client.

7.2. Path Signature Based Reconnection

Figure 13:
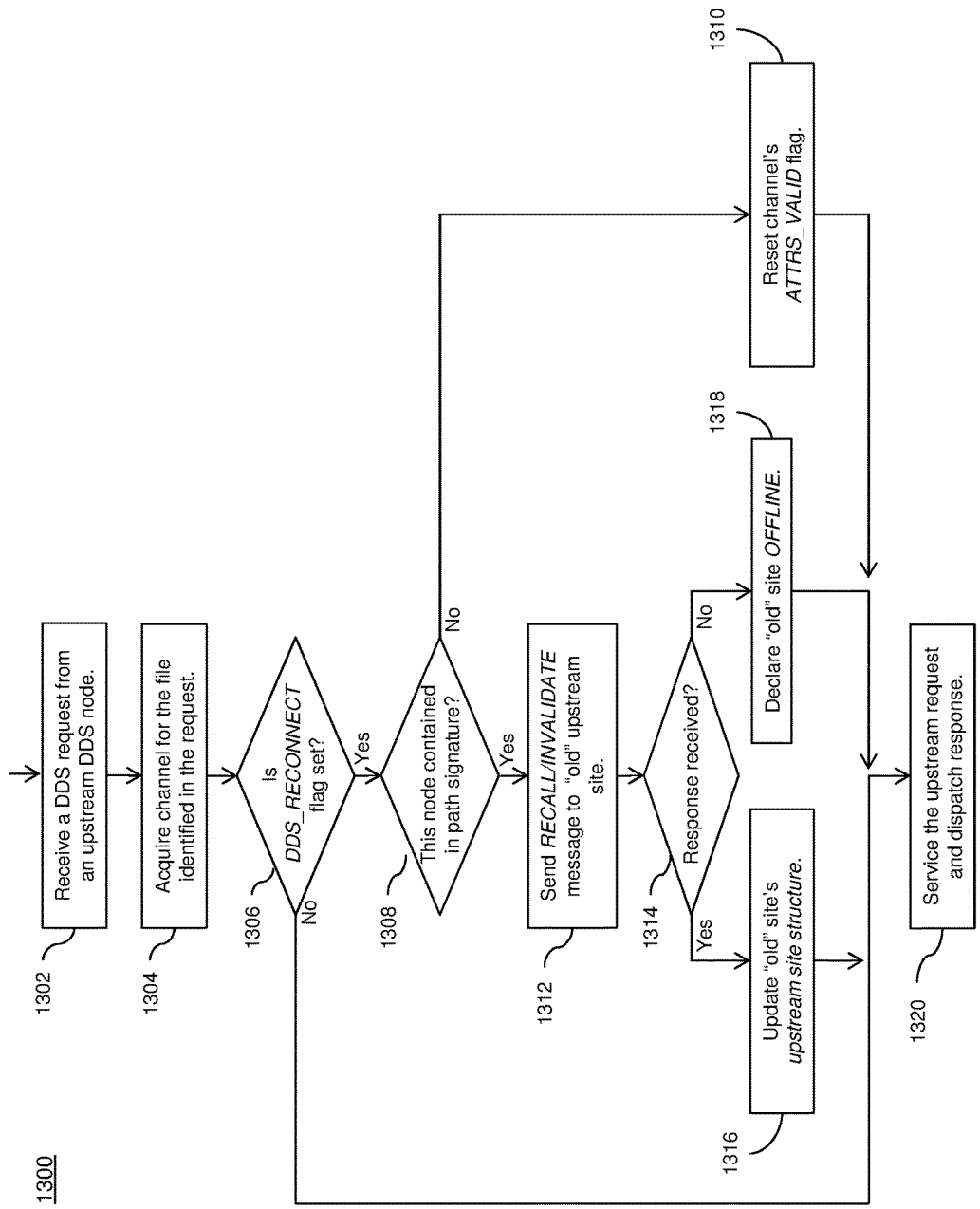
FIG. 13 is a flowchart illustrating an example of a method employed to reconnect an upstream DDS node.

FIG. 13 is a flowchart illustrating an example of a method 1300 employed to reconnect an upstream DDS node.

FIG. 13 illustrates that the method 1300 can include receiving 1302 a DDS request from an upstream site.

FIG. 13 also shows that the method 1300 can include acquiring 1304 the channel for the file identified in the request. When the channel does not already exist, a new channel is created and assigned to the identified file.

FIG. 13 further illustrates that the method 1300 can include determining 1306 if the DDS_RECONNECT flag is set in the request. When the DDS_RECONNECT flag is not set, the procedure for reconciling the upstream site structures at this site (and possibly sites above) is bypassed.

FIG. 13 then shows that when the DDS_RECONNECT flag is set the method 1300 can include determining 1308 if the path signature contained in the request identifies this node as a member of the "old" path. When the node is not a member of the "old" path, FIG. 13 illustrates that the method 1300 can include resetting 1310 the channel's attributes valid (ATTRS_VALID) flag to force this node "go downstream" to fetch valid attributes.

FIG. 13 shows that when this node is a member of the "old" path the method 1300 can include sending 1312 a DDS RECALL or INVALIDATE message to the "old" upstream site identified in the path signature.

FIG. 13 also shows that the method 1300 can include determining 1314 if a response to the DDS RECALL or INVALIDATE message is received.

FIG. 13 shows that when a response is received the method 1300 can include updating 1316 the upstream site structure of the "old" upstream site identified in the path signature.

FIG. 13 further illustrates that when a response is not received the method 1300 can include declaring 1318 the "old" upstream site identified in the path signature to be OFFLINE and recording this status by setting the OFFLINE flag in the upstream site structure of the "old" upstream site.

FIG. 13 finally shows that the method 1300 can include servicing 1320 the DDS request and then dispatching a response back to the upstream DDS node.

Note that this procedure may be repeated at multiple intermediate sites until a site on the "old" path is encountered. Resetting the ATTRS_VALID flag (step 1310 of FIG. 13) continually pushes a DDS_RECONNECT request further downstream until a site currently connected to the origin server is encountered. DDS_RECONNECT requests contain the full path signature of the upstream client node requesting the reconnection.

8. Any Port in a Storm

The DDS consistency mechanism ensures that all DDS portals are equivalent. The any port in a storm feature allows a DDS client node to switch to a new downstream node at any time. So, whenever a client node feels isolated it can elect to find a new partner.

The new partner may be at the same hierarchical level as the partitioned site, or it may be at any level closer to the server terminator site. When the new partner is at the same hierarchical level as the partitioned site, it must, in addition to responding to the request, send a message downstream informing that site that an upstream site has switched partners. This allows the downstream site to revoke whatever permissions it had granted the isolated site (isolated from the client attempting to reconnect and possibly also isolated from this site) and grant permissions along this new path.

Note that the any port in a storm feature, which has a downstream orientation, is only possible because of the consistency feature that has an upstream orientation. These two features work together to provide a highly consistent file access service layered on top of inherently unreliable networks such as the Internet.

The any port in a storm feature provides the resiliency required for extremely reliable communications.

The DDS consistency mechanism is completely dependent on extremely reliable communications.

The any port in a storm feature is completely dependent on the DDS consistency mechanism.

Neither feature, the DDS consistency mechanism or any port in a storm, can stand alone. But, when intertwined, they provide the solid foundation required for providing very strong consistency guarantees over highly distributed, unreliable networks.

9. Filehandles are Forever

DDS filehandles, patterned after NFS filehandles, are permanent filehandles. The file server generates an opaque file identifier during the processing of a lookup request and passes it back to a client. The client then uses this filehandle as a reference point in future read/write requests.

There is no timeout on the validity of a DDS (or NFS) filehandle. It is valid forever. The client system may present a filehandle received ten years ago (and not used since) and the file server must connect to the same file or return the error STALE_FILEHANDLE if the file no longer exists.

U.S. patent application Ser. No. 12/558,482 (Nomadic File Systems) discloses the construction of globally unique permanent filehandles.

However, a remote NFS client accessing the same file would receive a file handle that uniquely identified the file forever. An NFS client may present a file handle that it received ten years ago and hasn't used since back to the file server and that server must either establish a connection with the original file or respond with an error indicating that the file handle is no longer valid. (A file handle is another type of object ID.)

A method commonly used by Unix based NFS file servers to create a permanent file id is to concatenate two 32 bit numbers, the inode number and the inode generation number, to create a 64 bit file id. Since each time an inode is assigned to a new file its generation number is incremented, an inode would have to be re-used over 4 billion times before a file id of this type could repeat. These 64 bit file ids are essentially good forever.

Permanent filehandles facilitate network error recovery operations by reducing to a bare minimum the amount of distributed state required for a disconnected DDS client site to successfully reconnect with the origin server. A DDS client needs nothing more than a filehandle to reconnect to a file. The DDS client does not need to know what directory, what filesystem or even what file server.

Server-Side Operations

When a concurrent write sharing condition arises, DDS server nodes must RECALL a modified upstream image projection (if there is one, and there can be only one) or INVALIDATE all upstream image projections supporting accelerated read operations.

An INVALIDATE or RECALL operation proceeds as follows:

A concurrent write sharing condition (multiple clients active on a file and at least one of them is writing) is detected at the onset of processing a file access request.

Notifications are prepared for each upstream site except the one that sent the request that precipitated this CWS condition. Each note contains two elements: a) a file identifier and b) an opcode (RECALL or INVALIDATE).

Each notification is dispatched to an upstream site using a self addressed stamped envelope (SASE) that the upstream site had previously sent to the downstream site.

The upstream site responds by dispatching a DDS_FLUSH request. At a minimum, this request contains a flag indicating that this request is an acknowledgement to the RECALL/INVALIDATE notification. In the case of a RECALL, the request also contains all file modifications.

After all upstream sites have responded, the downstream site proceeds with processing the original request.

When an upstream site is partitioned from its downstream site, the upstream site never receives the notification. So, the downstream site never receives confirmation that the upstream site has invalidated its cached image of the file.

When this occurs the downstream site may decide (depending on the currently established policies) to give up on the isolated site and continue servicing other clients. So, the downstream site may declare the upstream site OFFLINE and record that status in the upstream site structure (uss) associated with the upstream site. Then the downstream site, based on the established policy, may do one of the following:

The downstream site waits for communications to be re-established, receives confirmation from all upstream sites, and finally proceeds with processing the original request.

The downstream site proceeds with processing the original request. In this case, the isolated site is sidelined so that the server-side site can continue servicing the other client sites. The sidelined site will be dealt with and re-integrated when communications are re-established.

When communications are restored, the upstream site will promptly send a SASE. If the downstream site had chosen to wait it will quickly bounce the SASE back with the same note it had sent earlier.

During a network partition event, all DDS nodes on the server-side of the partition have a primary responsibility to protect and ensure the integrity of all DDS filesystem content. DDS must never lose or mangle data once that data has been successfully written to a DDS node.

The primary directive for DDS server-side nodes is therefore:

Never take any action that can possibly result in the loss or corruption of filesystem data.

So, during a network partition event, DDS server-side nodes act reflexively to ensure filesystem integrity. Then, throughout the partition event, the server-side nodes continue providing file services in conformance with the primary directive. However, these server-side nodes are pledged to filesystem integrity and have no real obligations to any client. DDS server-side nodes will quickly refuse any request that is not consistent with the PD.

Client-Side Operations

Although the DDS server-side of a network partition is not dedicated to servicing client systems, the other side of the partition is completely focused providing the best client service possible given the current circumstances. In particular, DDS client-side nodes are responsible for ensuring that no delayed write data (file modifications that have not yet been flushed to the origin) is ever lost.

The domain policy attributes in effect at each client-side node determine what actions the node performs when a network partition is detected, but a client-side node will generally safeguard its data first and then attempt to reconnect to the server-side and flush all file modifications back to their respective origin servers.

DDS client nodes continuously monitor the health and performance of all downstream paths, and for every path the client node is aware of all alternate paths. The statistics maintained for each path include:

running average of bytes/second,
average response time latency, and
uptime percentage.

When a DDS client node issues a request and fails to receive a response within a timeout window (typically 2 or 3 seconds), the node retransmits the request several times before declaring the downstream node OFFLINE.

When the downstream site is declared OFFLINE, the DDS client node simultaneously tries all alternate paths and selects the path with the best performance.

After all alternates have been tried, and none have been successful, DDS syncs all modifications to files from the disconnected downstream server to the site's stable memory (hard disk or flash memory). When downstream communications are restored, all file modifications are immediately flushed downstream.

Once all file modifications have been secured in stable memory, DDS either:

continues attempting to establish communication along original path and all alternate paths; or
returns an error indication to the client workstation.

In addition to performing whatever downstream communications are required to support the file access services the upstream site is providing, the upstream site also pings the downstream site once a second (typically). This enables the upstream site to quickly detect a partition event and, depending on the established policies, possibly stop providing access to cached files affected by the partition event.

When the upstream site fails to receive a reply to its ping, it retransmits the request several times before declaring the downstream node OFFLINE.

The upstream site will continue to periodically ping the downstream site. When a response is finally received, the site is declared ONLINE and both sites may begin re-synchronizing.

Site re-synchronization basically consists of re-syncing a series of individual files. And this is a straightforward process with one exception: an out of sequence write (which is explained in the following section).

Out of Sequence Writes

In the case where an upstream site has been modifying the file foo when a partition event occurs, it is possible that:

a CWS condition can arise, and
the RECALL message is not delivered, and
the upstream site modifies its image of foo before
the upstream site has detected the partition event via its fast ping polling.

At some point, the downstream site:
finally gives up on the upstreamer that has not responded to the RECALL notification,
marks the upstreamer OFFLINE, and
moves on with providing other clients with access to foo.
Then another client modifies foo.

Finally, the network is fixed and the upstreamer comes back ONLINE. When the upstreamer attempts to flush foo downstream: the downstream site MUST detect that the modification performed at the upstream site did not use the most current version of foo, and the request must be rejected with error code OUT_OF_SEQUENCE.

III. Recovery Procedures and Recovery Routines

Server-side nodes assume a rather passive role during a network failure. These nodes must receive file modifications that are being flushed downstream, but that is also what they do when the network is not broken. The main difference during a network failure is when a server-side node receives a flush with a path signature indicating an upstream site is reconnecting, it executes a recovery routine to transfer read/write permissions from the isolated upstream site to the site that sent this flush.

Client-side nodes bear almost the entire burden of recovering from network failures because they have service commitments to active clients that must be maintained. The client-side node "closest to" a failed network component will be the node that detects the failure and declares the network partitioned. The node will then execute a recovery procedure.

The recovery procedure will sequentially call upon various recovery routines, which are described in the following section.

Client-Side Recovery Routines int dds_monitor_ds_paths(CHANNEL *)

This routine is continuously executed by a thread dedicated to monitoring all downstream paths and maintaining performance statistics associated with each path. When a failure occurs, the information gathered by dds_monitor_ds_paths( ) may be referenced to quickly determine the best alternate path.

dds_monitor_ds_paths( ) maintains a path_state mini-database of all downstream paths emanating from this node. This routine may also periodically send its current path_state to a node that maintains and presents a global view of network operations.

int dds_reconnect(CHANNEL *cp, int mx)

This routine re-establishes a connection to the origin server for the file identified by the filehandle contained within the channel (cp→fh). dds_reconnect( ) is optimized for the speed of re-establishing a downstream connection because DDS nodes really don't like to be disconnected. This routine may reference the path_state mini-database to quickly select the most appropriate alternate path for the reconnection attempt.

A dds_reconnect( ) request always contains the issuing site's path signature and it always propagates through to the first node that is common to both the 'old' and the 'new' paths.

int dds_flush(CHANNEL *cp)

A dds_flush( ) request flows from a DDS client terminator site to a server terminator site as a single atomic network transaction. For large multi-transfer flushes, intermediate nodes may be simultaneously forwarding transfer n while receiving transfer n+1.

DDS flushes are atomic and synchronous. A flush is not considered successful until the client receives the server's OK response. A shadow copy is kept until a node receives an OK response from its immediate downstream site.

For large multi-transfer flushes, each transfer flows through intermediate nodes independently of the other transfers. All nodes store the flush data in shadow extents. When the server terminator site receives the last flush, it moves all shadow extents into the sunlight and dispatches an OK response back upstream. As the response propagates through each intermediate node, each node also sunlights its shadow extents.

Server-Side Recovery Routines int dds_transfer_permissions(CHANNEL *cp, int to_mx, int from_mx)

This routine RECALLS or INVALIDATES the file image at the upstream node 'from_mx' and simultaneously transfers whatever permissions node 'from_mx' had to node 'to_mx'. Node 'from_mx' may respond to the RECALL/INVALIDATE message or not. This server-side node does not really care. It has marked node 'from_mx' OFFLINE (for this file) and will handle all reintegration issues later when node 'from_mx'' attempts to reconnect this file.

int dds_recall(CHANNEL *cp, int mx)

This routine RECALLS or INVALIDATES the file image at an upstream node.

IV. DDS Failure Recovery Procedure

When a network component fails client-side nodes detect the failure and drive the transparent recovery procedure, during which the DDS filesystem client remains completely unaware of the failure.

The DDS failure recovery procedure operates in the following manner:

1. A client-side node dispatches a request downstream and is waiting for a response. If a response is not received within a timeout period, control will be returned to the thread that issued the request with an indication that the downstream site failed to respond.
2. The request thread calls dds_monitor_ds_paths(cp) to determine whether the path to the downstream site is operational. This routine, constantly fast pinging the downstream site, is the authority with respect to determining link status.
3. If the link is still good, the thread will just re-issue the request again. This request will have the same message identifier (xid) as the original. If the downstream site did respond to the previous request, the response to this request is guaranteed to be the same response (thanks to the duplicate request cache).
4. If the link is down, the request thread references the path_state mini-database and selects the 'best' alternate path and then calls dds_reconnect(cp, mx) to re-establish a connection to the DDS server-side network. (Or alternatively, this thread may spawn a bunch of threads that would simultaneously attempt to re-establish connections to the DDS server-side network. Then, when several of the attempts are successful, one of the paths would be selected and the others could be disconnected or just allowed to atrophy.)
5. If the reconnect attempt is not successful, the request thread responds to the request (that it had originally received from an upstream client) with an error status of DDS_BAD_LINK. The upstream site will treat this error status the same as a TIMEOUT. So, the request thread at the upstream site will start executing step 2 above.
6. If the reconnect attempt is successful, the request thread immediately flushes all dirty data downstream. This flush operates as previously described: it is atomic and synchronous all the way to the server terminator site.
7. Once all file modifications have been secured, DDS operations switch into "normal" mode. The filesystem client is still accessing the file, but the path has been changed. The client remains unaware of the change.

Reintegration of Isolated Nodes

When an isolated network segment "comes back online", isolated nodes automatically re-synchronize their images of all files "crossing" the link that had failed.

Channels containing modified data have the highest priority. Each is flushed downstream. The server-side will accept or reject each flush on an individual basis. A flush will only be rejected if the file was modified somewhere else while this client-side node was partitioned. The client-side node must have a means of handling a flush rejection. This probably includes a) saving the dirty data that was just rejected, and b) notifying the user that there is a conflict that must be resolved.

The reintegration process is essentially complete after all dirty files have been flushed. Files that were being read before the partition event occurred can now be read again. No special processing is required. Cached file images will be updated on a demand basis if the source file has been modified since the image was fetched.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A networked computing system where a file access request has been passed between an upstream site and a file service proxy cache node, the networked computing system comprising:
   an upstream site, the upstream site including:
      one or more hardware processors;
      system memory coupled to the one or more hardware processors, the system memory storing instructions that are executable by the one or more hardware processors;
      the one or more hardware processors executing the instructions stored in the system memory to flush modified file data downstream towards an origin file server, including the following:
         acquire a site channel containing modified file data, the site channel bound into a single integrated channel traversing one or more file service proxy cache nodes through which the flush request will pass; and prepare a flush request, the flush request:
being an atomic operation;
including a file access request, wherein the file access request includes making modifications to a file located on the origin file server; and
including modified file data to save to a stable memory, wherein:
the modified file data is sent in multiple network flush requests; and
each flush request is uniquely identified; and
the last flush request of the atomic operation is identified with a flag referred to as DATA_COMPLETE; and
each flush request includes at least one modified file extent;

the one or more file service proxy cache nodes, each file service proxy cache node:
being a network node located between the upstream site and the origin file server node; and
including:
one or more hardware processors;
system memory coupled to the one or more hardware processors, the system memory storing instructions that are executable by the one or more hardware processors;
the one or more hardware processors executing the instructions stored in the system memory to complete a flush request, including the following:
receive the flush request from the upstream site;
store each received modified file extent in a first shadow extent referenced by the site channel, wherein the shadow extent is a temporary buffer;
dispatch the received flush request containing the modified file extents to a downstream node, wherein the downstream node includes at least one of:
a file service proxy cache node closer to the origin file server node; or
the origin file server node; and the origin file server node including:
one or more hardware processors;
system memory coupled to the one or more hardware processors, the system memory storing instructions that are executable by the one or more hardware processors;
the one or more hardware processors executing the instructions stored in the system memory to complete a flush request, including the following:
receive the flush request from the file service proxy cache node located upstream of the origin file server node;
store each received modified file extent in a second shadow extent referenced by the site channel, wherein the shadow extent is a temporary buffer;
if the flush request contains a DATA_COMPLETE flag:
write all shadow extents to the origin filesystem; and
if all shadow extents are successfully written to the origin filesystem:
replace all extents that have shadow extents with their respective shadow extent; and send a response to the file service proxy cache node located upstream of the origin file server node that includes a flag referred to as ALL_DATA_RECEIVED that indicates all data was successfully received; and
send a first status code, wherein the first status code indicates the successful completion of the flush request;
if all shadow extents are not successfully written to the origin filesystem:
discard all shadow extents; and
send a response to the file service proxy cache node located upstream of the origin file server node that includes a second status code, wherein the second status code indicates the failure of the flush request;
if the flush request does not contain a DATA_COMPLETE flag:
send a response to the file service proxy cache node located upstream of the origin file server node that includes the first status code, wherein the first status code indicates the successful completion of the flush request; and wherein each of the file service proxy cache nodes and the upstream site:
receive a flush request response from the downstream node, the response including a status code, wherein the status code includes at least one of:
the first status code; or
the second status code;
replace all extents that have shadow extents with their respective shadow extent when the status code is the first status code;
delete all modified file data saved to the shadow extents when the status code is the second status code; and wherein each of the file service proxy cache nodes:
send a response to an upstream node, wherein:
the upstream node includes at least one of:
a file service proxy cache node closer to the upstream site; or
the upstream site; and
the response includes at least one of:
the first status code; or
the second status code.

2. The system of claim 1, wherein the instructions stored in the system memory of the upstream site is the same as:
the instructions stored in the system memory of each of the one or more file service proxy cache nodes; and
the instructions stored in the system memory of the origin file server node.

3. The system of claim 2, wherein the flush request includes a flush level, the flush level indicating the class of memory to which the flush data will be propagated.

4. The system of claim 3, wherein the flush level specifies the file service proxy cache node's cache memory as the flush destination.

5. The system of claim 3, wherein the flush level specifies the file service proxy cache node's persistent memory as the flush destination.

6. The system of claim 3, wherein the flush level specifies the file on the origin file server node as the flush destination.

7. The system of claim 3, wherein when the flush level specifies a file service proxy cache node's cache memory or persistent memory, the file service proxy cache node operates as the origin file server node.

8. The system of claim 1 further comprising:
when the file service proxy cache node receives a response to the flush request:
the file service proxy cache node remaining committed to the upstream site by only accepting and processing file access requests targeting the file from the upstream site when an ALL_DATA_RECEIVED response flag is not set, indicating that the origin file server node has not received and accepted all flush data.

* * * * *